(12) United States Patent
Best et al.

(10) Patent No.: US 8,489,874 B2
(45) Date of Patent: Jul. 16, 2013

(54) ENCRYPTION STE COMMUNICATIONS THROUGH PRIVATE BRANCH EXCHANGE (PBX)

(75) Inventors: Fiona S. Best, Crofton, MD (US); Dorothy A. McClintock, Highland, MD (US); William Jeremy Lee, Crownsville, MD (US); Wesley R. Hartwell, Sykesville, MD (US); Eric Reed, Jackson, NJ (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1831 days.

(21) Appl. No.: 11/008,615

(22) Filed: Dec. 10, 2004

(65) Prior Publication Data

US 2005/0210235 A1 Sep. 22, 2005

Related U.S. Application Data

(60) Provisional application No. 60/553,547, filed on Mar. 17, 2004.

(51) Int. Cl.
*H04L 29/06* (2006.01)
*H04M 1/00* (2006.01)

(52) U.S. Cl.
USPC ........... 713/152; 713/170; 713/171; 713/181; 713/182; 380/247; 380/249; 380/255; 380/256; 380/257; 380/270; 726/4; 455/554.1; 455/554.2; 379/390.04

(58) Field of Classification Search
USPC ......... 713/152; 455/554.1–554.2; 379/390.04
See application file for complete search history.

(56) References Cited

U.S. PATENT DOCUMENTS

| 4,223,185 A * | 9/1980 | Picou ........................... 708/404 |
| 4,445,118 A | 4/1984 | Taylor et al. |
| 4,850,018 A | 7/1989 | Vogt |
| 4,866,759 A | 9/1989 | Riskin |
| 4,924,458 A * | 5/1990 | Obara ........................... 370/360 |
| 4,928,107 A | 5/1990 | Kuroda et al. |
| 5,252,985 A | 10/1993 | Christinsin |
| 5,280,625 A | 1/1994 | Howarter |
| 5,305,384 A | 4/1994 | Ashby |
| 5,400,394 A * | 3/1995 | Raman et al. ............... 379/88.07 |

(Continued)

OTHER PUBLICATIONS

Daniel et al., 2002, The Future NarrowBand Digital Terminal, IEEE, pp. 589-592.*

(Continued)

*Primary Examiner* — Edan Orgad
*Assistant Examiner* — Jenise Jackson
(74) *Attorney, Agent, or Firm* — William H. Bollman

(57) ABSTRACT

A reach back secure communications terminal includes a digital PBX adapter that offers immediate and secure voice, data and video connectivity over any of various commercially available PBX systems. In addition to use with a PBX system, integrated components simplify access to varied networks allowing deployed users to select and connect quickly to a network that best supports their present mission. Commercial or optional NSA Type 1 encryption may be implemented. Networking options include any of PSTN, PBX, GSM (or CDMA or other cell telephone standard), SAT, IP and WiFi. The digital PBX adapter includes an audio mixer that converts a 4-wire input from a handset jack of a PBX handset base, into a 2-wire output destined for an encryption unit (FNBDT). The user determines a necessary gain of the audio mixer for the particular PBX system by trial and error using a multi-position switch.

21 Claims, 33 Drawing Sheets

U.S. PATENT DOCUMENTS

| | | | |
|---|---|---|---|
| 5,521,607 A | | 5/1996 | Deasy |
| 5,530,724 A | * | 6/1996 | Abrams et al. ............... 375/345 |
| 5,689,568 A | | 11/1997 | Laborde |
| 5,764,195 A | | 6/1998 | Colclough et al. |
| 5,793,498 A | | 8/1998 | Scott et al. |
| 5,842,125 A | | 11/1998 | Modzelesky |
| 5,850,602 A | | 12/1998 | Tisdale |
| 6,023,762 A | | 2/2000 | Dean et al. |
| 6,081,229 A | | 6/2000 | Soliman et al. |
| 6,130,651 A | | 10/2000 | Yanagisawa |
| 6,310,578 B1 | | 10/2001 | Ying |
| 6,313,786 B1 | | 11/2001 | Sheynblat et al. |
| 6,346,919 B1 | | 2/2002 | Wang et al. |
| 6,396,914 B1 | | 5/2002 | Mirville |
| 6,414,638 B1 | | 7/2002 | Egashira et al. |
| 6,424,648 B1 | * | 7/2002 | Ng et al. ...................... 370/352 |
| 6,430,504 B1 | | 8/2002 | Gilbert et al. |
| 6,433,732 B1 | | 8/2002 | Dutta |
| 6,525,687 B2 | | 2/2003 | Roy et al. |
| 6,525,688 B2 | | 2/2003 | Chou et al. |
| 6,529,731 B2 | | 3/2003 | Modzelesky |
| 6,694,134 B1 | | 2/2004 | Lu |
| 6,798,294 B2 | | 9/2004 | Kuiri |
| 6,922,172 B2 | | 7/2005 | Oshiyama et al. |
| 6,978,165 B2 | | 12/2005 | Martinez |
| 6,985,722 B1 | * | 1/2006 | Snelgrove et al. ............ 455/420 |
| 7,068,995 B1 | | 6/2006 | Geddes |
| 7,130,424 B2 | | 10/2006 | Marshall |
| 7,283,543 B1 | * | 10/2007 | Thompson .................... 370/401 |
| 7,385,992 B1 | | 6/2008 | Koch |
| 7,545,819 B1 | * | 6/2009 | Hardie et al. ................. 370/401 |
| 7,586,898 B1 | | 9/2009 | Koch |
| 7,724,902 B2 | | 5/2010 | Best |
| 2001/0021252 A1 | * | 9/2001 | Carter et al. .................. 380/247 |
| 2002/0021791 A1 | * | 2/2002 | Heilmann et al. ............. 379/189 |
| 2002/0054630 A1 | * | 5/2002 | Hoefer .......................... 375/222 |
| 2002/0070881 A1 | | 6/2002 | Marcarelli |
| 2002/0077809 A1 | * | 6/2002 | Walles .......................... 704/201 |
| 2002/0080801 A1 | * | 6/2002 | Derks ........................... 370/401 |
| 2002/0115425 A1 | * | 8/2002 | Carter ........................... 455/410 |
| 2003/0009659 A1 | * | 1/2003 | DiSanto et al. ............... 713/151 |
| 2003/0092381 A1 | * | 5/2003 | Buel et al. ..................... 455/13.1 |
| 2004/0004976 A1 | * | 1/2004 | Zhang et al. .................. 370/503 |
| 2004/0013097 A1 | * | 1/2004 | Massa ........................... 370/335 |
| 2004/0123095 A1 | | 6/2004 | Marshall |
| 2004/0160948 A1 | * | 8/2004 | Ozu ............................... 370/352 |
| 2004/0161086 A1 | | 8/2004 | Buntin et al. |
| 2004/0204007 A1 | | 10/2004 | Ho |
| 2004/0218742 A1 | * | 11/2004 | Schmid et al. ................ 379/189 |
| 2004/0234056 A1 | * | 11/2004 | Heilmann et al. ............. 379/196 |
| 2005/0008161 A1 | * | 1/2005 | Olsen et al. ................... 380/276 |
| 2005/0025315 A1 | * | 2/2005 | Kreitzer ........................ 380/270 |
| 2005/0047570 A1 | | 3/2005 | Schmid et al. |
| 2005/0091407 A1 | * | 4/2005 | Vaziri et al. ................... 709/246 |
| 2005/0210234 A1 | * | 9/2005 | Best et al. ..................... 713/151 |
| 2006/0072520 A1 | | 4/2006 | Chitrapu |

OTHER PUBLICATIONS

Tomi Engdahl, 2001, Telephone Line Audio Interface Circuits, EPanoram.net.*

Damiel et al.. The Future Narrowband and Digital Terminal. School of Electrical and Computer Engineering. 2002. pp. 589-592.

Folded Meandered-Patch Monople Antenna for Triple-Band Operation; by Fa-Shian; Wen Kuan Su; Kin-Lu Wong; Antennas and Propogation Society International Symposium, 2003, IEEE vol. 1, Jun. 22-27, 2003, pp. 278-281, vol. 1.

* cited by examiner

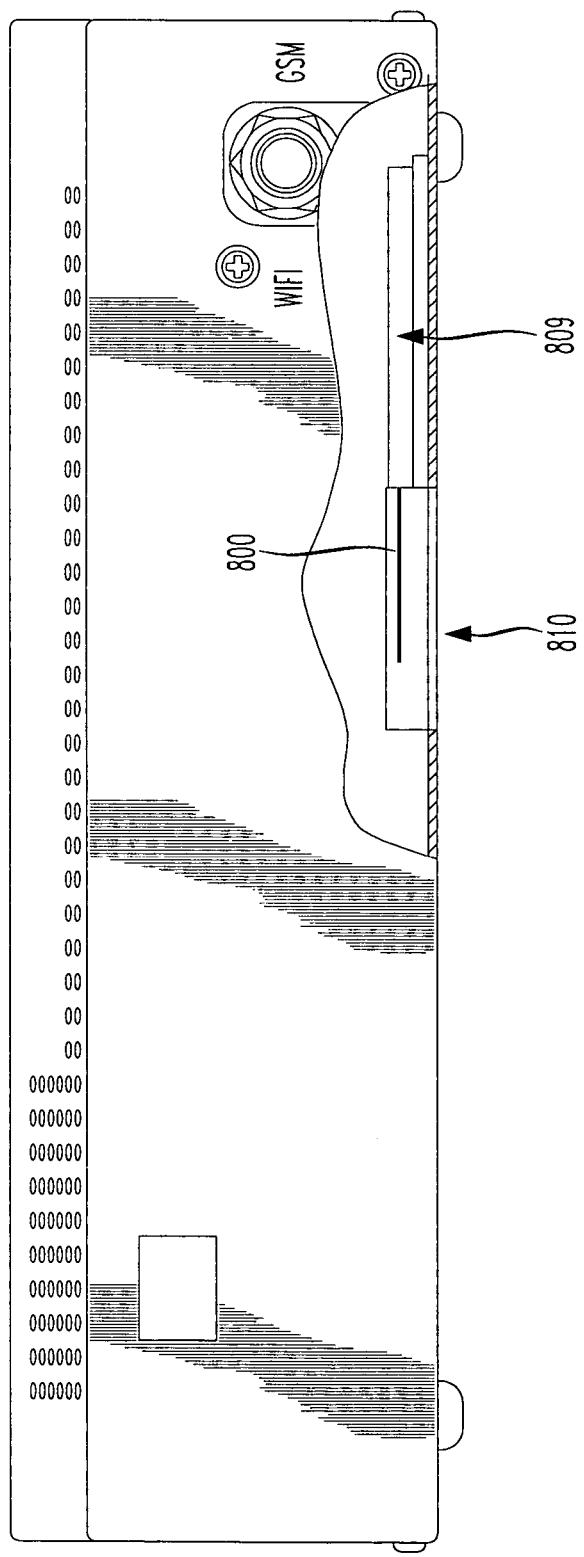

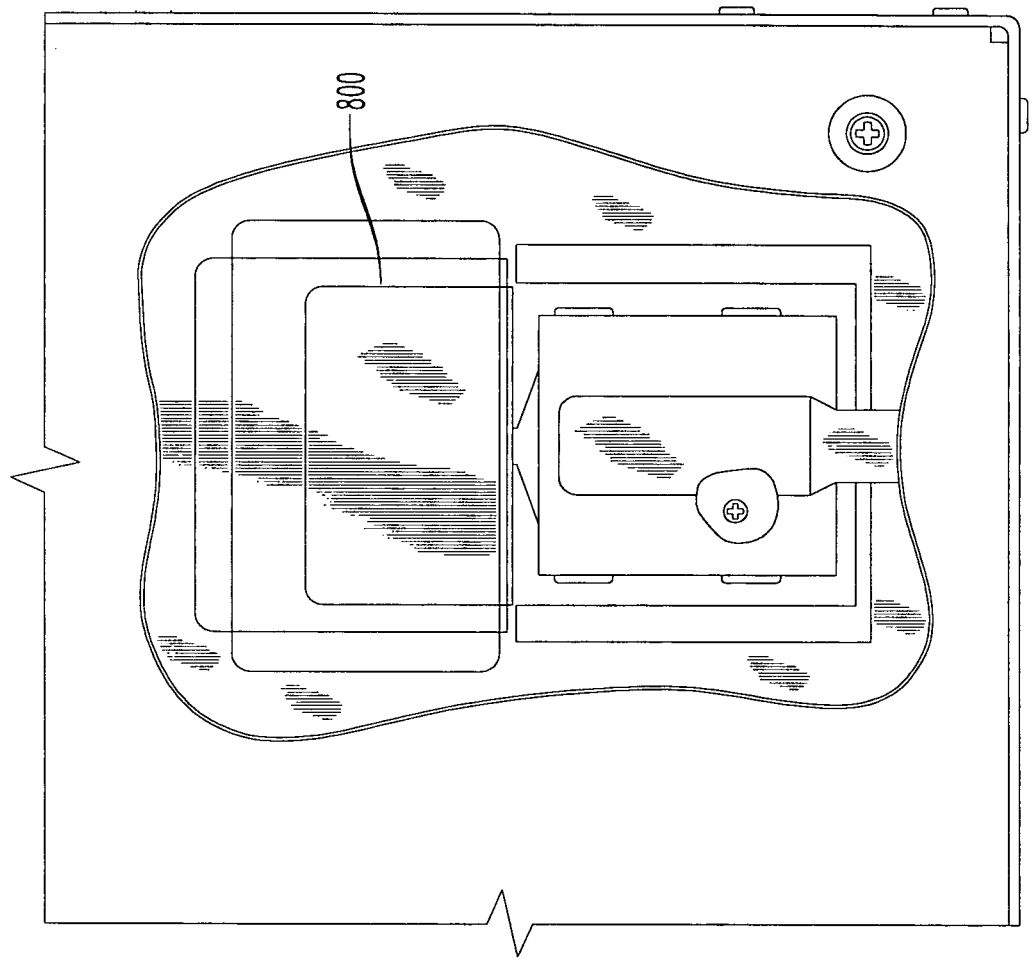
FIG. 2D(2)

FIG. 4

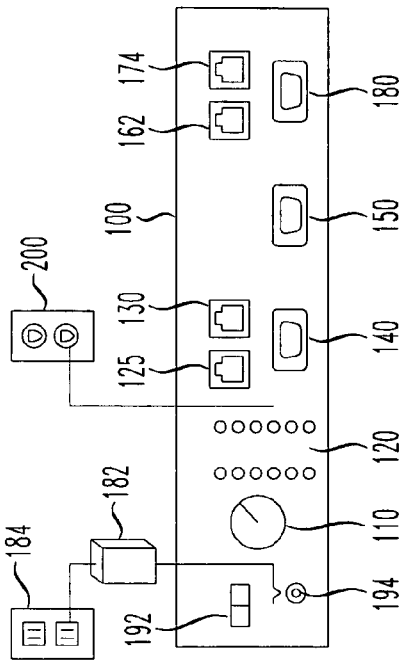

PSTN VOICE CALL

- CLEAR
  - CABLES
    - CONNECT AC POWER AND SWITCH POWER ON
    - CONNECT ONE END OF AN RJ-11 TELEPHONE CORD TO "PSTN IN" JACK ON THE SWL1400 AND THE OTHER END TO A WALL JACK
  - SWITCH
    - SET NETWORK SELECTOR TO PSTN
  - ANTENNAS
    - N/A
  - INTERFACE
    - PICK UP HANDSET, USE SWL 1400 TELEPHONE KEYPAD TO DIAL
- ENCRYPTED
  - CABLES
    - CONNECT AC POWER AND POWER ON SWL1400
    - CONNECT ONE END OF AN RJ-11 TELEPHONE CORD TO "PSTN IN" JACK ON THE SWL1400 AND THE OTHER END TO A WALL JACK
  - SWITCH
    - SET TO PSTN
  - ANTENNAS
    - N/A
  - INTERFACE
    - PICK UP SWL1400 TELEPHONE HANDSET AND USE SWL1400 TELEPHONE KEYPAD TO DIAL
      IF THE REMOTE END IS CONFIGURED FOR "AUTO SECURE ON ANSWER", THE SECTERA OR TALKSECURE
      WILL ESTABLISH A SECURE CALL WITH THE REMOTE END
      - OR
    - AFTER THE CLEAR CALL IS ESTABLISHED, ONE OF THE CALLING PARTIES MUST PRESS
      "SECURE" ON THE ENCRYPTOR PAD TO CHANGE TO SECURE MODE

FIG. 5

PSTN DATA CALL
• CLEAR
  - CABLES
    • CONNECT AC POWER AND SWITCH POWER ON
    • CONNECT RJ-11 TELEPHONE CORD TO "PSTN IN" AND WALL JACK
    • CONNECT THE DB-9 END OF A SERIAL CABLE TO THE "SECURE DATA IN FROM PC" PORT OF THE SWL1400 AND THE OTHER END TO THE SERIAL PORT OF THE PC. BE CERTAIN THE COM PORT IS SET UP TO RECOGNIZE THE SWL1400 EXTERNAL MODEM (SET UP AS A 9600 GENERIC MODEM).
  - SWITCH
    • SET TO PSTN
  - ANTENNAS • N/A
  - INTERFACE
    • ENABLE ALLOW CLEAR DATA FROM SECURITY MENU.
    • ON THE PC, USE THE DATA APPLICATION (E.G., WINDOWS DIAL-UP CONNECTION OR HYPERTERMINAL) TO DIAL INTO THE REMOTE SITE.
• ENCRYPTED
  - CABLES
    • CONNECT AC POWER AND SWITCH POWER ON SWL1400
    • CONNECT RJ-11 TELEPHONE CORD TO "PSTN IN" AND WALL JACK.
    • CONNECT A SHIELDED DB-9 SERIAL CABLE TO THE "SECURE DATA IN FROM PC" PORT OF THE SWL1400 AND THE OTHER END TO THE SERIAL PORT OR USB PORT OF THE PC.

- - - - - - - - - - CONTINUED ON SHEET 10 - - - - - - - - - -

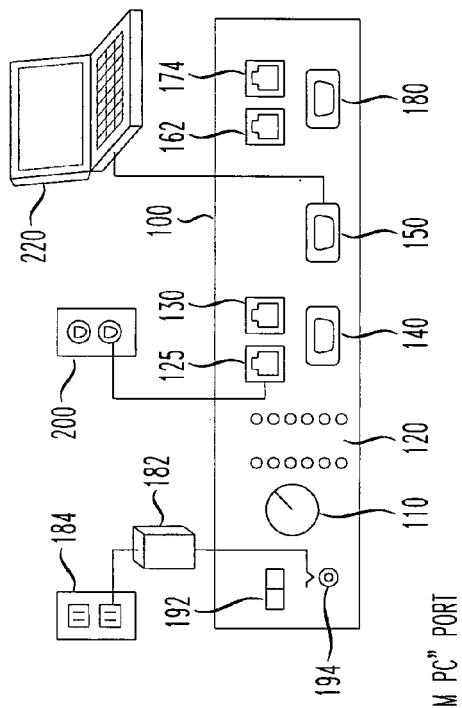

FIG. 5

---- CONTINUED FROM SHEET 9 ----

- SWITCH
  • SET TO PSTN
- ANTENNAS • N/A
- INTERFACE
  • ON THE PC, USE THE DATA APPLICATION (E.G., WINDOWS DIAL-UP CONNECTION OR HYPERTERMINAL) TO DIAL INTO THE REMOTE SITE.
  • THE REMOTE END MAY BE CONFIGURED WITH "AUTO ANSWER DATA" ENABLED (AUTO ANSWER RING MAY BE USED TO SPECIFY THE NUMBER OF RINGS BEFORE AUTO ANSWER DATA ANSWERS CALL) OR REMOTE END CAN USE THE DATA APPLICATION (AT COMMAND ATA) TP ANSWER.
  - OR
  • TOGGLE SECURE SELECT ON CONFIG MENU TO DATA OPTION. THEN, FOLLOW PROCEDURES FOR PLACING ENCRYPTED PSTN SECURE VOICE CALL TO ESTABLISH SECURE DATA CALL.

FIG. 6

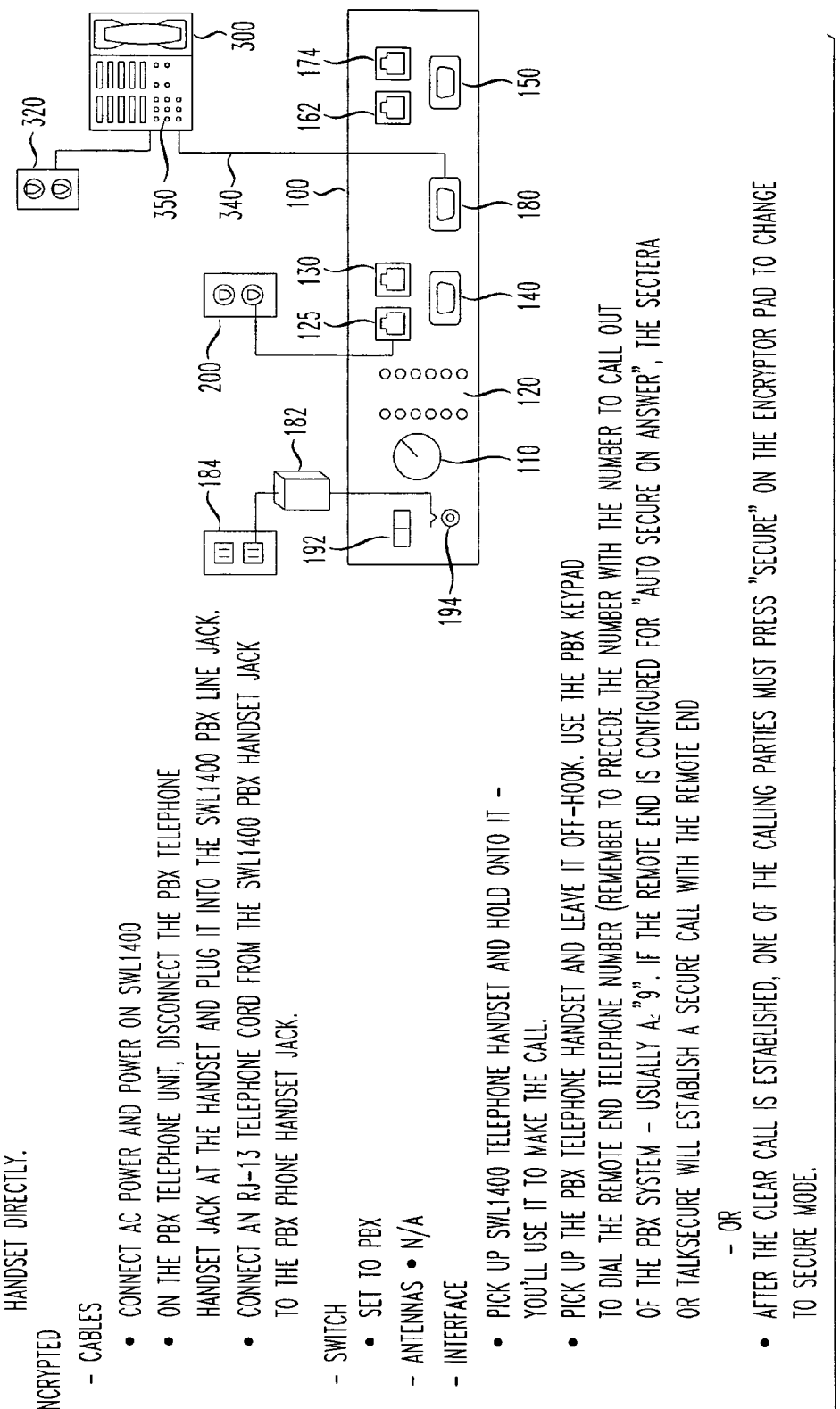

PBX VOICE CALL

- CLEAR • FOR CLEAR PBX VOICE CALLS, THE SWL1400 DOES NOT PROVIDE ANY FURTHER CAPABILITY BEYOND USING THE PBX TELEPHONE HANDSET DIRECTLY.

- ENCRYPTED
  - CABLES
    • CONNECT AC POWER AND POWER ON SWL1400
    • ON THE PBX TELEPHONE UNIT, DISCONNECT THE PBX TELEPHONE HANDSET JACK AT THE HANDSET AND PLUG IT INTO THE SWL1400 PBX LINE JACK.
    • CONNECT AN RJ-13 TELEPHONE CORD FROM THE SWL1400 PBX HANDSET JACK TO THE PBX PHONE HANDSET JACK.
  - SWITCH
    • SET TO PBX
  - ANTENNAS • N/A
  - INTERFACE
    • PICK UP SWL1400 TELEPHONE HANDSET AND HOLD ONTO IT – YOU'LL USE IT TO MAKE THE CALL.
    • PICK UP THE PBX TELEPHONE HANDSET AND LEAVE IT OFF-HOOK. USE THE PBX KEYPAD TO DIAL THE REMOTE END TELEPHONE NUMBER (REMEMBER TO PRECEDE THE NUMBER WITH THE NUMBER TO CALL OUT OF THE PBX SYSTEM – USUALLY A "9". IF THE REMOTE END IS CONFIGURED FOR "AUTO SECURE ON ANSWER", THE SECTERA OR TALKSECURE WILL ESTABLISH A SECURE CALL WITH THE REMOTE END
    – OR
    • AFTER THE CLEAR CALL IS ESTABLISHED, ONE OF THE CALLING PARTIES MUST PRESS "SECURE" ON THE ENCRYPTOR PAD TO CHANGE TO SECURE MODE.

FIG. 7

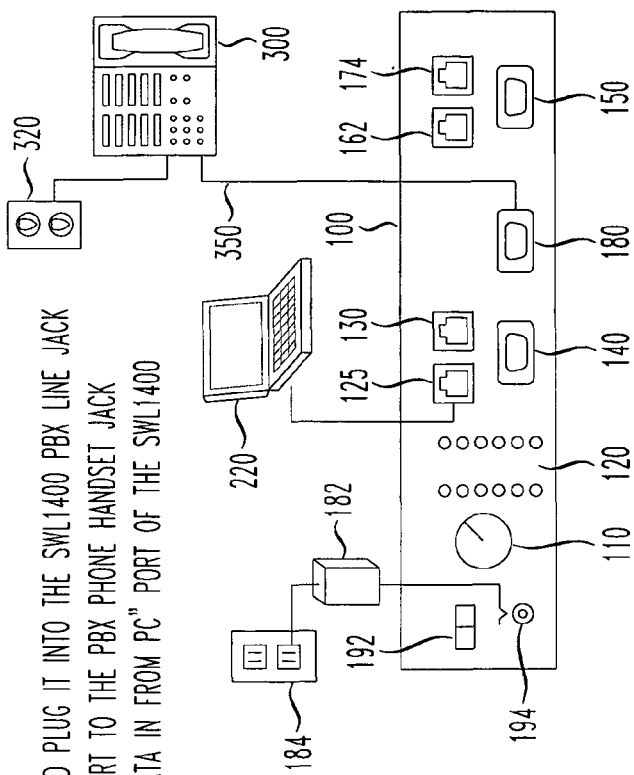

PBX DATA CALL
- CLEAR
  - CABLES
    - CONNECT AC POWER AND SWITCH POWER ON THE SWL1400
    - DISCONNECT THE PBX TELEPHONE HANDSET JACK CORD AT THE HANDSET AND PLUG IT INTO THE SWL1400 PBX LINE JACK
    - CONNECT AN RJ-13 TELEPHONE CORD FROM THE SWL1400 PBX HANDSET PORT TO THE PBX PHONE HANDSET JACK
    - CONNECT THE DB-9 END OF A SHIELDED SERIAL CABLE TO THE "SECURE DATA IN FROM PC" PORT OF THE SWL1400 AND THE OTHER END TO THE SERIAL OR USB PORT OF THE PC. BE CERTAIN COM PORT IS SET UP TO RECOGNIZE THE SWL 1400 EXTERNAL MODEM (SET UP AS A 9600 BPS GENERIC MODEM).
  - SWITCH
    - SET TO PBX
  - ANTENNAS • N/A
  - INTERFACE
    - ENABLE ALLOW CLEAR DATA FROM SECURITY MENU.
    - ON THE PC, SET UP THE DATA APPLICATION (E.G. WINDOWS DIAL-UP CONNECTION OR HYPERTERMINAL) TO DIAL INTO THE REMOTE SITE.
    - PICK UP SWL1400 TELEPHONE HANDSET AND LEAVE IT OFF-HOOK.
    - PICK UP THE PBX TELEPHONE HANDSET AND LEAVE IT OFF HOOK.
    - USING THE KEYPAD ON THE PBX TELEPHONE, DIAL THE DESTINATION TELEPHONE NUMBER (REMEMBER TO ENTER THE NUMBER TO GET OUT OF THE PBX - USUALLY A "9" - PRIOR TO ENTERING THE TELEPHONE NUMBER.
    - AFTER YOU'VE DIALED THE NUMBER ON THE HANDSET, CLICK ON THE CONNECT BUTTON ON THE DIAL-UP WINDOW TO INITIATE THE DATA CALL LINK.

------ CONTINUED ON SHEET 14 ------

------- CONTINUED FROM SHEET 13 -------

- ENCRYPTED
  - CABLES
    - FOLLOW INSTRUCTIONS FOR CABLES IN CLEAR PBX DATA CALL ABOVE.
  - SWITCH
    - SET TO PBX
  - ANTENNAS • N/A
  - INTERFACE
    - ON THE PC, SET UP THE DATA APPLICATION (E.G., WINDOWS DIAL-UP CONNECTION OR HYPERTERMINAL) TO DIAL INTO THE REMOTE SITE.
    - PICK UP SWL1400 TELEPHONE HANDSET AND LEAVE IT OFF-HOOK. PICK UP THE PBX TELEPHONE HANDSET AND LEAVE IT OFF HOOK.
    - USING THE KEYPAD ON THE PBX TELEPHONE, DIAL THE DESTINATION TELEPHONE NUMBER (REMEMBER TO PRECEED THE NUMBER WITH THE NUMBER TO CALL OUT OF THE PBX SYSTEM - USUALLY A "9". AFTER INITIATING THE CALL, CLICK ON THE CONNECT BUTTON ON THE DIAL-UP WINDOW.
    - THE REMOTE END MAY BE CONFIGURED WITH "AUTO ANSWER DATA" ENABLED (AUTO ANSWER RING MAY BE USED TO SPECIFY THE NUMBER OF RINGS BEFORE AUTO ANSWER DATA ANSWERS CALL) OR REMOTE END CAN USE THE DATA APPLICATION (AT COMMAND ATA) TO ANSWER.
      - OR
    - TOGGLE SECURE SELECT ON CONFIG MENU TO DATA OPTION. THEN, FOLLOW PROCEDURES FOR PLACING ENCRYPTED PBX SECURE VOICE CALL TO ESTABLISH SECURE DATA CALL.

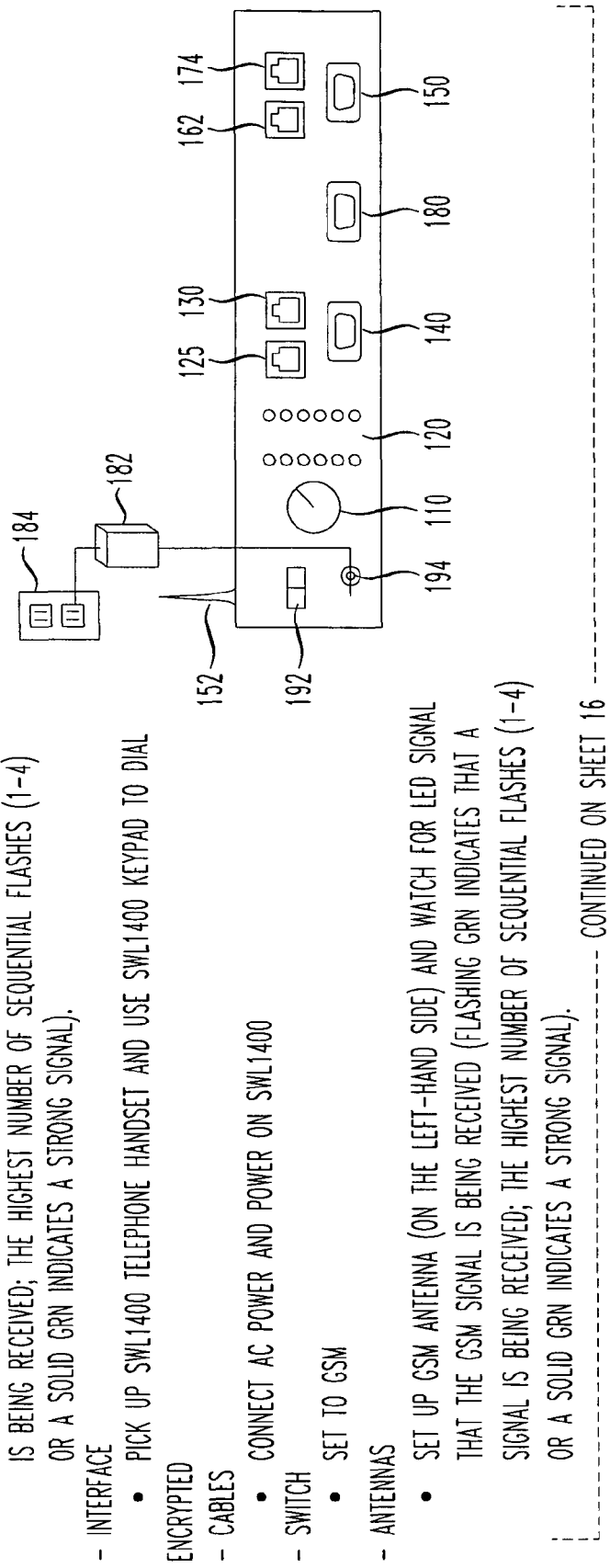

GSM VOICE CALL

- CLEAR
  - CABLES
    • CONNECT AC POWER AND SWITCH POWER ON SWL 1400
  - SWITCH
    • SET TO GSM
  - ANTENNAS
    • SET UP GSM ANTENNA AND WATCH FOR LED SIGNAL THAT THE GSM SIGNAL IS BEING RECEIVED (FLASHING GRN INDICATES THAT A SIGNAL IS IS BEING RECEIVED; THE HIGHEST NUMBER OF SEQUENTIAL FLASHES (1-4) OR A SOLID GRN INDICATES A STRONG SIGNAL).
  - INTERFACE
    • PICK UP SWL1400 TELEPHONE HANDSET AND USE SWL1400 KEYPAD TO DIAL
- ENCRYPTED
  - CABLES
    • CONNECT AC POWER AND POWER ON SWL1400
  - SWITCH
    • SET TO GSM
  - ANTENNAS
    • SET UP GSM ANTENNA (ON THE LEFT-HAND SIDE) AND WATCH FOR LED SIGNAL THAT THE GSM SIGNAL IS BEING RECEIVED (FLASHING GRN INDICATES THAT A SIGNAL IS BEING RECEIVED; THE HIGHEST NUMBER OF SEQUENTIAL FLASHES (1-4) OR A SOLID GRN INDICATES A STRONG SIGNAL).

------ CONTINUED ON SHEET 16 ------

*FIG. 8*

--- CONTINUED FROM SHEET 15 ---

- INTERFACE
  - PICK UP SWL1400 TELEPHONE HANDSET AND USE SWL1400 KEYPAD TO DIAL. FOR A SECURE CALL, DIAL "02" FOLLOWED BY THE DESTINATION PHONE NUMBER (E.G., *02*202-555-1212) — THIS WILL INDICATE THAT YOU WANT TO MAKE A SECURE CALL.
  - IF THE REMOTE END IS CONFIGURED FOR "AUTO SECURE ON ANSWER", THE SECTERA OR TALKSECURE WILL ESTABLISH A SECURE CALL WHEN THE REMOTE END PICKS UP THE REMOTE TELEPHONE.
    - OR
  - WHEN THE REMOTE END PICKS UP THE HANDSET AND HEARS NO VOICE, THE REMOTE END USER MUST PRESS "SECURE" ON THE ENCRYPTOR PAD TO CHANGE TO SECURE MODE.

FIG. 9

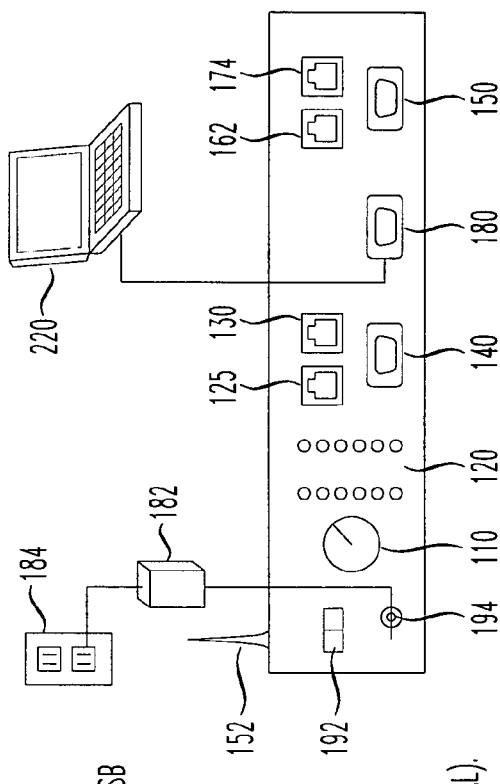

GSM NON-SECURE DATA CALL

- CLEAR
  - CABLES
    - CONNECT AC POWER AND SWITCH POWER ON SWL1400
    - CONNECT A DB-9 SERIAL CABLE TO THE "NON-SECURE GSM DATA IN" PORT OF THE SWL1400 AND THE OTHER END TO THE SERIAL PORT OR USB PORT OF THE PC.
  - SWITCH
    - SET TO GSM
  - ANTENNAS
    - SET UP GSM ANTENNA (ON THE LEFT-HAND SIDE) AND WATCH FOR LED SIGNAL THAT THE GSM SIGNAL IS BEING RECEIVED (FLASHING GRN INDICATES THAT A SIGNAL IS BEING RECEIVED; THE HIGHEST NUMBER OF SEQUENTIAL FLASHES (1-4) OR A SOLID GRN INDICATES A STRONG SIGNAL).
  - INTERFACE
    - ON THE PC, USE THE DATA APPLICATION (E.G., WINDOWS DIAL-UP CONNECTION OR HYPERTERMINAL) TO DIAL INTO THE REMOTE SITE.
    - REMOTE USER MUST ANSWER USING DATA APPLICATION (AT COMMAND ATA)

FIG. 10

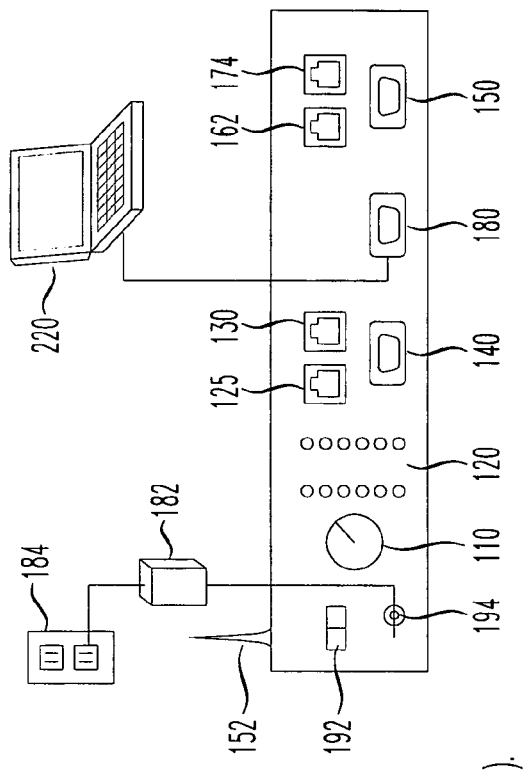

GSM SECURE DATA CALL

• ENCRYPTED

— CABLES
  • CONNECT AC POWER AND SWITCH POWER ON SWL1400
  • CONNECT A SHIELDED DB-9 SERIAL CABLE TO THE "SECURE DATA IN FROM PC" PORT OF THE SWL1400 AND THE OTHER END TO THE SERIAL PORT OF THE PC.

— SWITCH
  • SET TO GSM

— ANTENNAS
  • SET UP GSM ANTENNA (ON THE LEFT-HAND SIDE) AND WATCH FOR LED SIGNAL THAT THE GSM SIGNAL IS BEING RECEIVED (FLASHING GRN INDICATES THAT A SIGNAL IS BEING RECEIVED; THE HIGHEST NUMBER OF SEQUENTIAL FLASHES (1-4) OR A SOLID GRN INDICATES A STRONG SIGNAL).

— INTERFACE
  • ON THE PC, USE THE DATA APPLICATION (E.G., WINDOWS DIAL-UP CONNECTION OR HYPERTERMINAL) TO DIAL INTO THE REMOTE SITE. DIAL *02* FOLLOWED BY THE DESTINATION TELEPHONE NUMBER (E.G., *02*202-555-1212)
  • THE REMOTE END MAY BE CONFIGURED WITH "AUTO ANSWER DATA" ENABLED (AUTO ANSWER RING MAY BE USED TO SPECIFY THE NUMBER OF RINGS BEFORE AUTO ANSWER DATA ANSWERS CALL) OR REMOTE END CAN USE THE DATA APPLICATION (AT COMMAND ATA) TO ANSWER.
  — OR —
  • TOGGLE SECURE SELECT ON CONFIG MENU TO DATA OPTION. THEN, FOLLOW PROCEDURES FOR PLACING ENCRYPTED GSM VOICE CALL TO ESTABLISH SECURE DATA CALL.

FIG. 11

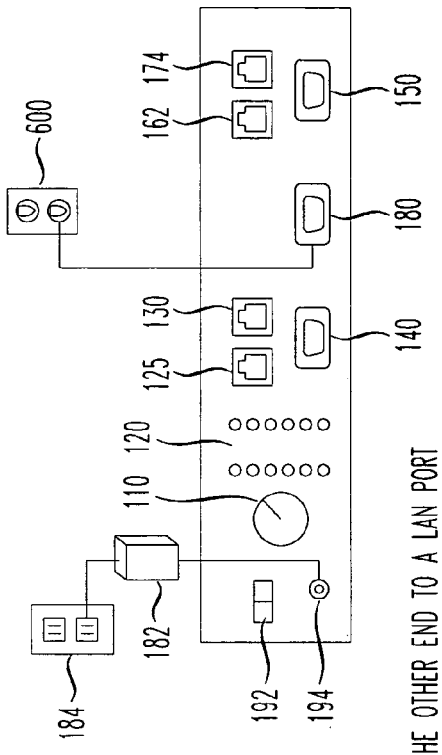

IP VOICE CALL

• CLEAR
  - CABLES
    • CONNECT AC POWER AND POWER ON SWL1400
    • CONNECT AN RJ-45 JACK TO THE ETHERNET PORT OF THE SWL1400 AND THE OTHER END TO A LAN PORT.
  - SWITCH
    • SET TO IP
  - ANTENNA • N/A
  - INTERFACE
    • PICK UP SWL1400 TELEPHONE HANDSET AND USE SWL1400 KEYPAD TO DIAL. PRECEDE THE TELEPHONE NUMBER WITH *99 TO USE THE HIGHER RATE CODEC AND A 1 (E.G., *99,1202-555-1212).

• ENCRYPTED
  - CABLES
    • CONNECT AC POWER AND POWER ON SWL1400
    • CONNECT AN RJ-45 JACK TO THE ETHERNET PORT OF THE SWL1400 AND THE OTHER END TO A LAN PORT.
  - SWITCH
    • SET TO IP
  - ANTENNA • N/A
  - INTERFACE
    • PICK UP SWL1400 TELEPHONE HANDSET AND USE SWL1400 KEYPAD TO DIAL; THE SIGNAL LED ON THE IP NETWORK INDICATOR SHOULD LIGHT SOLID GREEN. PRECEDE THE TELEPHONE NUMBER WITH *99 TO USE THE HIGHER RATE CODEC (E.G., *99, 1202-555-1212).
    • IF THE REMOTE END IS CONFIGURED FOR AUTO SECURE ON ANSWER, THE SECTERA OF TALKSEUCRE WILL ESTABLISH A SECURE CALL WITH THE REMOTE END
      - OR -
    • AFTER THE CONNECTION IS ESTABLISHED, ONE OF THE CALLING PARTIES MUST PRESS THE "SECURE" BUTTON TO GO SECURE.

FIG. 12

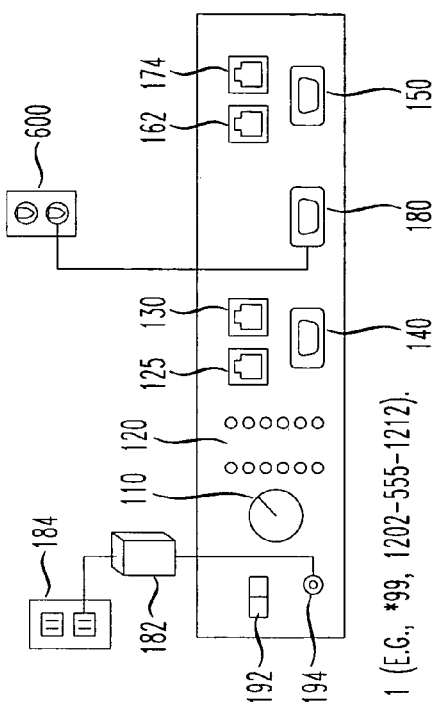

IP DATA CALL
- CLEAR
  - CABLES
    - CONNECT AC POWER AND POWER ON SWL1400
    - CONNECT A DB-9 SERIAL CABLE TO THE "SECURE DATA IN FROM PC PORT OF THE SWL1400 AND THE OTHER END TO THE SERIAL PORT OR USB PORT OT THE PC.
  - SWITCH
    - SET TO IP
  - ANTENNA • N/A
  - INTERFACE
    - ON THE PC, USE THE DATA APPLICATION (E.G., WINDOWS DIAL-UP CONNECTION OR HYPERTERMINAL) TO DIAL INTO THE REMOTE SITE. WHEN ENTERING ENABLE ALLOW CLEAR DATA FROM SECURITY MENU.
    - THE TELEPHONE NUMBER OF THE DESTINATION POINT, FIRST TYPE IN *99 THEN ENTER THE TELEPHONE NUMBER OF THE DESTINATION SITE BEGINNING WITH 1 (E.G., *99, 1202-555-1212).
- ENCRYPTED
  - CABLES
    - CONNECT AC POWER AND POWER ON SWL1400
    - CONNECT A DB-9 SERIAL CABLE TO THE "SECURE DATA IN FROM PC" PORT OF THE SWL1400 AND THE OTHER END TO THE SERIAL PORT OR USB PORT OF THE PC.
    - CONNECT AN RJ-45 JACK TO THE ETHERNET PORT OF THE SWL1400 AND THE OTHER END TO A LAN PORT

------ CONTINUED ON SHEET 21 ------

*FIG. 12*

------- CONTINUED FROM SHEET 20 -------

- SWITCH
  - SET TO IP
- ANTENNA • N/A
- INTERFACE

- ON THE PC, USE THE DATA APPLICATION (E.G., WINDOWS DIAL-UP CONNECTION OR HYPERTERMINAL) TO DIAL INTO THE REMOTE SITE. WHEN ENTERING THE TELEPHONE NUMBER OF THE DESTINATION POINT, FIRST TYPE IN *99 THEN ENTER THE TELEPHONE NUMBER OF THE DESTINATION SITE (E.G., *99, 1202-555-1212).

- THE REMOTE END MAY BE CONFIGURED WITH "AUTO ANSWER DATA" ENABLED (AUTO ANSWER RING MAY BE USED TO SPECIFY THE NUMBER OF RINGS BEFORE AUTO ANSWER DATA ANSWERS CALL) OR REMOTE END CAN USE THE DATA APPLICATION (AT COMMAND ATA) TO ANSWER.

- OR -

- TOGGLE SECURE SELECT ON CONFIG MENU TO DATA OPTION. THEN, FOLLOW PROCEDURES FOR PLACING ENCRYPTED IP VOICE CALL TO ESTABLISH SECURE DATA CALL.

FIG. 13

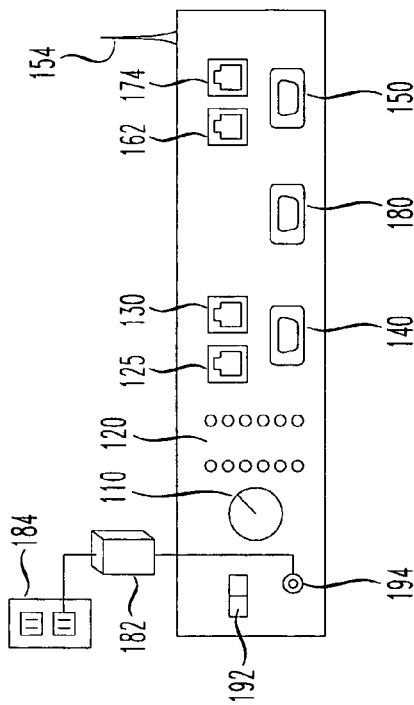

WIFI VOICE CALL

- CLEAR
  - CABLES
    • CONNECT AC POWER AND SWITCH POWER ON SWL1400
  - SWITCH
    • SET TO WIFI
  - ANTENNA
    • SET UP WIFI ANTENNA (ON THE RIGHT-HAND SIDE) AND WATCH FOR LED SIGNAL THAT THE WIFI SIGNAL IS BEING RECEIVED.
  - INTERFACE
    • PRIOR TO MAKING A CALL YOU WILL NEED TO LET THE SWL1400 PICK UP AN IP ADDRESS FROM THE NETWORK. THIS MAY TAKE SEVERAL MINUTES.
    • WHEN YOU HAVE A DIAL TONE USE SWL1400 KEYPAD TO DIAL, (USE A *99 AND 1 PRIOR TO THE NUMBER DIALED, E.G., *99, 1-202-555-1212

- ENCRYPTED
  - CABLES
    • CONNECT AC POWER AND POWER ON SWL1400
  - SWITCH
    • SET TO WIFI

------- CONTINUED ON SHEET 23 -------

FIG. 13

------- CONTINUED FROM SHEET 22 -------

- ANTENNA
  - SET UP WIFI ANTENNA (ON RIGHT-HAND SIDE) AND WATCH FOR LED SIGNAL THAT THE WIFI SIGNAL IS BEING RECEIVED
- INTERFACE
  - PRIOR TO MAKING A CALL YOU WILL NEED TO LET THE SWL1400 PICK UP AN IP ADDRESS FROM THE NETWORK. THIS MAY TAKE SEVERAL MINUTES.
  - WHEN YOU HAVE A DIAL TONE USE SWL1400 KEYPAD TO DIAL, (USE A *99 AND 1 PRIOR TO THE NUMBER DIALED, E.G., *99, 1-202-555-1212)
  - IF THE REMOTE END IS CONFIGURED FOR AUTO SECURE ON ANSWER, THE SECTERA OT TALKSECURE WILL ESTABLISH A SECURE CALL WITH THE REMOTE END
    - OR
  - AFTER THE CLEAR CALL IS ESTABLISHED, ONE OF THE CALLING PARTIES MUST PRESS "SECURE" ON THE ENCRYPTOR PAD TO CHANGE TO SECURE MODE.

FIG. 14

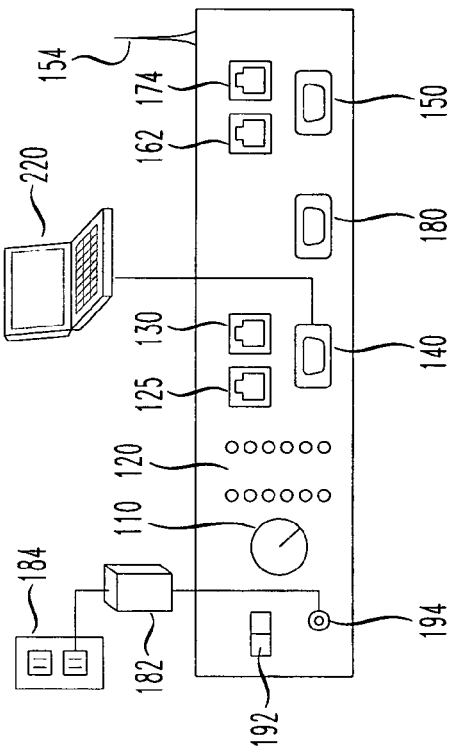

WIFI DATA CALL

- CLEAR
  - CABLES
    - CONNECT AC POWER AND SWITCH POWER ON SWL1400
    - CONNECT A DB-9 SERIAL CABLE TO THE "SECURE DATA IN FROM PC" PORT OF THE SWL1400 AND THE OTHER END TO THE SERIAL PORT OR USB PORT OF THE PC.
  - SWITCH
    - SET TO WIFI
  - ANTENNA
    - SET UP WIFI ANTENNA AND WATCH FOR LED SIGNAL THAT THE WIFI SIGNAL IS BEING RECEIVED.
  - INTERFACE
    - ENABLE ALLOW CLEAR DATA FROM SECURITY MENU.
    - PRIOR TO MAKING A CALL YOU WILL NEED TO LET THE SWL1400 PICK UP AN IP ADDRESS FROM THE NETWORK. THIS MAY TAKE SERVRAL MINUTES.
    - WHEN YOU HAVE A DIAL TONE, ON THE PC, USE THE DATA APPLICATION (E.G., WINDOWS DIAL-UP CONNECTION OR HYPERTERMINAL) TO DIAL INTO THE REMOTE SITE (USE A *99 AND 1 PRIOR TO THE NUMBER DIALED, E.G., *99, 1-202-555-1212

---------- CONTINUED ON SHEET 25 ----------

FIG. 14

—— CONTINUED FROM SHEET 24 ——

- ENCRYPTED
  - CABLES
    - CONNECT AC POWER AND POWER ON SWL1400
    - CONNECT A DB-9 SERIAL CABLE TO THE "SECURE DATA IN FROM PC" PORT OF THE SWL1400 AND THE OTHER END TO THE SERIAL PORT OR USB PORT OF THE PC.
  - SWITCH
    - SET TO WIFI
  - ANTENNA
    - SET UP WIFI ANTENNA AND WATCH FOR LED SIGNAL THAT THE WIFI SIGNAL IS BEING RECEIVED
  - INTERFACE
    - ON THE PC, USE THE DATA APPLICATION (E.G., WINDOWS DIAL-UP CONNECTION OR HYPERTERMINAL) TO DIAL INTO THE REMOTE SITE. WHEN ENTERING THE TELEPHONE NUMBER OF THE DESTINATION POINT, FIRST TYPE IN *99 THEN ENTER THE TELEPHONE NUMBER OF THE DESTINATION SITE (E.G., *99, 1202-555-1212).
    - THE REMOTE END MAY MAY BE CONFIGURED WITH "AUTO ANSWER DATA" ENABLED (AUTO ANSWER RING MAY BE USED TO SPECIFY THE NUMBER OF RINGS BEFORE AUTO ANSWER DATA ANSWERS CALL) OR REMOTE END CAN USE THE DATA APPLICATION (AT COMMAND ATA) TO ANSWER.
      - OR
    - TOGGLE SECURE SELECT ON CONFIG MENU TO DATA OPTION. THEN, FOLLOW PROCEDURES FOR PLACING ENCRYPTED WIFI VOICE CALL TO ESTABLISH SECURE DATA CALL.

FIG. 16

DATA RATES

| ENCRYPTOR | PSTN | PBX | GSM | IP | WIFI | SAT |
|---|---|---|---|---|---|---|
| OMNIxi TYPE 1 (V2.5) | 1 33.6 Kbps | 1 33.6 Kbps | 1 9.6 Kbps | 1 24 Kbps | 1 33.6 Kbps | 1 2.4 Kbps 5 |
| SECTERA WIRELINE TYPE-1 | 1 33.6 Kbps | 1 33.6 Kbps | 1 9.6 Kbps | 1 24 Kbps | 1 33.6 Kbps | 1 2.4 Kbps 5 |
| SECTERA WIRELINE TALKSECURE | 1 33.6 Kbps | 1 33.6 Kbps | 1 9.6 Kbps | 1 24 Kbps | 1 33.6 Kbps | 1 2.4 Kbps 5 |
| COPYTELE 1200 | 2 2.4 Kbps | 2 2.4 Kbps | 2 2.4 Kbps | 2 24 Kbps | 2 2.4 Kbps | 2 2.4 Kbps 5 |

MAXIMUM DATA RATE CONSTRAINTS:

1. MAXIMUM RATE CONSTRAINED BY THE ENCRYPTOR USE OF THE V.34 MODEM FOR ASYNCHRONOUS DATA
2. MAXIMUM RATE CONSTRAINED BY THE ENCRYPTOR MODEM
3. MAXIMUM RATE CONSTRAINED BY GSM CIRCUIT SWITCHED DATA NETWORK USED FOR SECURE DATA
4. MAXIMUM RATE CONSTRAINED BY USE OF VOIP SERVICE FOR TRANSMITTING DATA OUT THE ENCRYPTOR PSTN PORT
5. MAXIMUM RATE CONSTRAINED BY INDIUM SATELLITE NETWORK

ENCRYPTION STE COMMUNICATIONS THROUGH PRIVATE BRANCH EXCHANGE (PBX)

The present application claims priority from U.S. Provisional Application No. 60/553,547, entitled "Portable Remote A Reach-Back Communications Terminal", filed Mar. 17, 2004.

BACKGROUND OF THE INVENTION

1. Field of the Invention

This invention relates generally to computer and communication networks. More specifically, it relates to a portable reach-back communications system that provides extremely flexible secure or non-secure voice, video and data services to a remote user.

2. Background of the Related Art

In 1970, the Secure Telephone Unit (STU-I) was developed, followed in 1975 by the STU-II, and finally in 1987 by the third generation STU-III.

The STU-III terminals are designed to operate as either an ordinary telephone or a secure instrument over a dial-up public switched telephone network (PSTN). The STU-III operates in full-duplex over a single telephone circuit using echo canceling modem technology. Typically, STU-IIIs come equipped with 2.4 and 4.8 kbps code-excited linear prediction (CELP) secure voice. Secure data can be transmitted at speeds of 2.4, 4.8 and 9.6 kbps, though data throughput between two STU-IIIs is only as great as the slowest STU-III.

A STU-III operates by taking an audio signal and digitizing it into a serial data stream, which is then mixed with a keying stream of data created by an internal ciphering algorithm. This mixed data is then passed through a COder-DECoder (CODEC) to convert it back to audio so it can be passed over the phone line. STU-IIIs also allow a serial data stream to pass through the phone and into the ciphering engine to allow its usage as an encrypted modem when not used for voice.

The keying stream is a polymorphic regenerating mathematic algorithm which takes an initialization key and mathematically morphs it into a bit stream pattern. The keying stream is created by the key generator, and is the heart of the STU-III. A portion of the keying stream is then mixed back into the original key, and the process is repeated. The result is a pseudo-random bit stream that if properly implemented is extremely difficult to decrypt. Even the most sophisticated cryptographic algorithm can be easily expressed in the form of a simple equation in Boolean algebra, with the initialization keys being used to define the initial key generator settings, and to provide morphing back to the equation.

While STU-III provides secure communications, audio quality was vastly improved with the development of purely digital Standard Telephone Equipment (STE) devices.

An STE device utilizes an ISDN digital telephone line connection. There is substantial improvement in voice quality using an STE as opposed to the STU-III used over analog telephone lines. Most STE devices are STU-III secure mode compatible with enhanced abilities including voice-recognition quality secure voice communication, and high-speed secure data transfers (up to 38.4 kbps for asynchronous or 128 kbps for synchronous data transfers). When connected to an analog telephone line, an STE unit will only support STU-III voice and data capabilities.

The STU-III and STE are quite useful in fixed use, i.e., in an office environment or perhaps carried to another location having access to analog or digital telephone line access.

FIG. 18 is a depiction of a conventional fragmented secure communications network.

In particular, as shown in FIG. 18, a network backbone 1800 allows various like devices to securely connect to each other. The network backbone 1800 includes such communication networks as ISDN TDM, ATM and IP. Devices that can connect to the network backbone 1800 include an ISDN telephone 1810, a voice-over-IP computer terminal 1820, a voice-over-IP telephone 1830, TRI-TAC & MSE devices 1840, cellular telephones 1850, communicating use using various standards including CDMA, GSM, TDMA and iDEN. Other devices that can connect to the network backbone 1800 include tactical digital radios 1850, analog cellular telephones 1860, satellite communications 1870, a dial-up computer terminal 1880, and a public switched telephone network telephone 1890.

In operation, each of the devices transmitting data to the network backbone 1800 must encrypt their respective data streams. Each of the devices receiving data from the network backbone 1800 must un-encrypt their respective data streams.

A conventional vocoder for use with the network backbone 1800 is the Mixed-Excitation Linear Predictive (MELP) vocoder. THe MELP vocoder is a dual-rate low rate coder that operates at 1200 bits-per-second (bps) and 2400 bps. The MELP vocoder meets military standard MIL-STD-3005 and NATO STANAG 4591.

FNBDT is an acronym that corresponds to Digital Secure Voice Protocol (DSVP) transport layer and above. DSVP operates over most data and voice network configurations with a Least Common Denominator for interoperability. DSVP interoperates with many media including wireless, satellite, IP and cellular. DSVP adapts to the data rate of the connection, with modems training down. DSVP negotiates security/application features with application to point-to-point communications and multi-point communications. DSVP supports realtime, near realtime and non-realtime applications.

FIG. 19 is a depiction of a conventional combination wired and wireless communication network supporting secure communications. Secure operation requires wireless circuit switched data service and use of a data telephone number.

In particular, as shown in FIG. 19, a combination wired and wireless communication network comprises various analog and digital communication networks 1900, such as PSTN 1901, analog communication networks 1902 and digital communication networks 1903. Devices connecting to the various analog and digital communication networks 1900 include mobile satellite service devices 1910 connecting to a satellite service 1911, e.g., Iridium, Globalstar and ICO. The mobile satellite service devices 1910 communicate through a Iridium satellite system. Further devices connecting to the various analog and digital communication networks 1900 include an STE 1920, digital cellular telephones 1930 using, e.g., GSM standards, digital cellular telephones 1940 connecting to a CDMA network. A tactical MSE/TRI-TAC network 1950 allows various devices to connect to the various communication networks 1900. Devices connecting to the tactical MSE/TRI-TAC network 1950 are, e.g., JTR 1952, deployable LMR 1954 and cellular tactical STE 1956. The tactical MSE/TRI-TAC network 1950 can connect to a CDMA network. A STU-III 1970 and analog cellular telephone 1972, e.g., CipherTAC 2000, connect to the analog network 1902.

In operation, CDMA communications occur at 800 Mhz over CONUS approved networks, such as Verizon and ALLTEL. GSM communications occur at 900 Mhz, 1800 Mhz and 1900 Mhz over CONUS approved networks, such as T-Mobile and AT&T. OCONUS European GSM, many approved based on commercial approval of TimeportII GSM phone within SECTRA-GSM secure terminal.

Any of the communication devices of FIG. 19 can obtain a secure voice connection with any secure, like communication device.

FIG. 20 is a depiction of a conventional deployable secure communication system utilizing a satellite communication network.

In particular, as shown in FIG. 20, a secure encryption STE 700 with suitable interface hardware is utilized to provide a connection path to a wireless connection to a similarly secure STE via a satellite transceiver 914, e.g., an Inmarsat M4 terminal. In the conventional system of FIG. 20, an ISDN link is utilized between the STE 700 and a suitable satellite two-way communication transceiver and antenna 914.

In operation, voice data is encrypted by the STE 700, and transmitted in a secure environment over a physically secure satellite, e.g., the M4 INMARSAT satellite transceiver 914.

It is vitally important that the STE 700 stay physically secured, to maximize protection of the information being passed thereover. Also, to further maximize protection of the information, the satellite transceiver 914 is conventionally set up and maintained within a secure environment, and usually travels with the STE 700.

Conventional systems are typically physically large, e.g., the size of a van. More importantly, such conventional systems require all elements to be maintained in a secure environment, including the data transport system (e.g., satellite communication system) over which the data travels to another secure communications terminal. Such secure data transport systems are costly to install and maintain, and always run a risk of being compromised.

FIG. 21 is a depiction of a conventional CDMA to GSM secure call setup.

In particular, before two-party secure voice traffic starts, FNBDT Call Setup Application messages are exchanged using an FNBDT Application Reliable Transport and Message Layer Protocols.

FIG. 22 is a depiction of a conventional FNBDT example call.

In particular, FNBDT secure voice & data may be sent over may network segments. The connection shown use CDMA, PSTN and GSM networks.

The prior art uses a plurality of different devices, one for connection to each network that a user desires to connect with. Thus, there is a need for a small, lightweight, easily portable and easily deployable communication system that is not only even more secure than conventional systems, but which also allows flexibility in use of non-secure data transport systems.

Such conventional secure systems are typically physically large but more importantly allow for only direct secure connection communication between a remote user and a like receiver to maintain security in the communications. While this is quite useful in many situations, only limited communications are possible in a direct connection. For instance, direct, secure connectivity does not also allow access to non-secure public communication systems, e.g., the Internet.

There is a need for a small, lightweight, and extremely flexible and adaptable communications terminal capable of quick, convenient and easy use with a multitude of network environments, and for a deployable communication system that is not only more secure than conventional systems, but which also allows flexibility in use of non-secure data transport systems.

SUMMARY OF THE INVENTION

In accordance with the principles of the present invention, a reach-back communications terminal comprises adaptation to accept an FNBDT encryption device, and an audio mixer between an input from a PBX handset base and the STE encryption device. The audio mixer converts a 4-wire input from the PBX handset base into a 2-wire output destined for the STE encryption device.

A method of allowing encrypted communications over an unsecure private branch exchange (PBX) system in accordance with another aspect of the present invention comprises disconnecting a handset from a PBX handset base unit. A 4-wire input to an audio mixer is connected to a handset jack on the PBX handset base unit vacated by the handset. An encryption unit is connected to a 2-wire output of the audio mixer.

BRIEF DESCRIPTION OF THE DRAWINGS

FIG. 2D(1) shows a rear cut-away view of the reach-back communications terminal, in accordance with the principles of the present invention.

FIG. 2D(2) shows a base cut-away view of the reach-back communications terminal, in accordance with the principles of the present invention.

FIG. 4 shows the reach-back communications terminal set up to establish voice communications through a PSTN network, in accordance with the principles of the present invention.

FIG. 5 shows the reach-back communications terminal set up to establish data communications through a PSTN network, in accordance with the principles of the present invention.

FIG. 6 shows the reach-back communications terminal set up to establish voice communications through a PBX network, in accordance with the principles of the present invention.

FIG. 7 shows the reach-back communications terminal set up to establish data communications through a PBX network, in accordance with the principles of the present invention.

FIG. 8 shows the reach-back communications terminal set up to establish voice communications through a GSM network, in accordance with the principles of the present invention.

FIG. 9 shows the reach-back communications terminal set up to establish non-secure data communications through a GSM network, in accordance with the principles of the present invention.

FIG. 10 shows the reach-back communications terminal set up to establish secure data communications through a GSM network, in accordance with the principles of the present invention.

FIG. 11 shows the reach-back communications terminal set up to establish IP voice communications over an IP network, in accordance with the principles of the present invention.

FIG. 12 shows the reach-back communications terminal set up to establish IP data communications over an IP network, in accordance with the principles of the present invention.

FIG. 13 shows the reach-back communications terminal set up to establish WiFi voice communications over a WiFi network, in accordance with the principles of the present invention.

FIG. 14 shows the reach-back communications terminal set up to establish WiFi data communications over a WiFi network, in accordance with the principles of the present invention.

FIG. 16 shows the potential data rates for the different types of communication networks available with use on the reach-back communication terminal, in accordance with the principles of the present invention.

DETAILED DESCRIPTION OF ILLUSTRATIVE EMBODIMENTS

Figure 1:
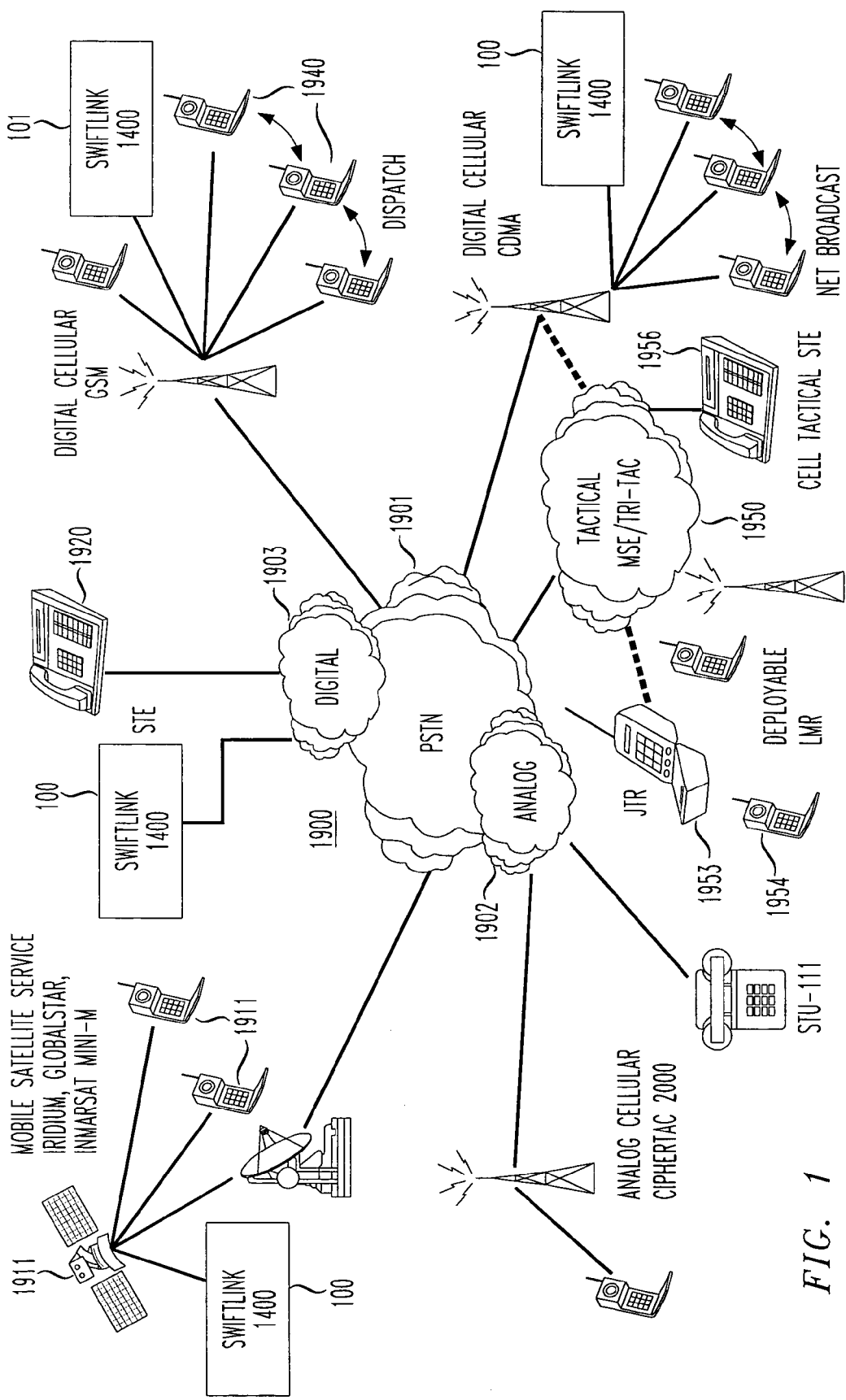
FIG. 1 shows a combination wired and wireless communication network supporting secure communications including a reach-back communications network, in accordance with the principles of the present invention.

The communications terminal disclosed herein is an extremely portable and fully capable remote access communications terminal ideal for reach-back secure communications over any of many network options, and other uses. Extending the reach of a headquarters' voice, data and video network services, a reach-back communications terminal as disclosed herein offers key benefits. For instance, high availability and reliable connectivity are provided, as are total access to vital resources, and secure extension to the home office. Moreover, a reach-back communications terminal as disclosed herein allows a user to select a lowest cost network routing option from among multiple possible network options.

The disclosed reach-back communications terminal is a remote communications terminal that enables highly available connections back to a headquarters network, delivering dependable access to mission-critical personnel and information. Integrated components simplify access to varied networks allowing deployed users to select and connect quickly to a network that best supports their present mission.

The disclosed reach-back communications terminal provides immediate and secure access. For example, first responders require secure, readily-available voice, data and video communications. The reach-back communications terminal disclosed herein enables fast and secure connectivity to multiple telecommunications networks. Security is guaranteed with commercial or optional NSA Type 1 encryption. As part of a system solution, reach-back communications terminal home stations provide end-to-end reach-back networking to infrastructure and services. For US government users, the reach-back communications terminal enables remote connections to secure networks, e.g., to SIPRNET or NIPRNET.

Type 1 encryption may include L-3 OMNIxi, General Dynamics Sectera (Omega) and Sectera Wireline. Non-Type 1 encryption includes General Dynamics TalkSecure (AES) and CopyTele Cryptele (AES or DES). The reach-back communications terminal preferably also implements Type 1 Future NarrowBand Digital Terminal (FNBDT) signaling and cryptography specifications as defined by the U.S. Government. Non-Type 1 cryptography includes standard P224 Elliptic Curve Cryptography (ECC) identified in FIPS 186-2.

The reach-back communications terminal implements Type 1 cryptography by implementing Type 1 FNBDT signaling and cryptography specifications as defined by the U.S. Government.

The reach-back communications terminal implements non-Type 1 cryptography using standard P-224 Elliptic Curve Cryptography (ECC), identified FIPS 186-2, to derive a pairwise, unique session key. ECC provides a higher security strength than RSA for a given key length and increases as the key length grows. For example, a 160-bit ECC key is equivalently secure to a 1024-bit RSA key, a 224-bit ECC key is more secure than a 2048-bit RSA key, and a 320-bit ECC key is equivalently secure to a 5120-bit RSA key.

During secure call setup, the reach-back communications terminal exchanges public keys with the remote terminal using FNBDT signaling. Traffic encryption is performed using the NIST approved Advanced Encryption System (AES) standard (Rijndael) and a 128-bit random key ($2^{128}$ possible keys).

The disclosed reach-back communications terminal is housed in an easily portable and lightweight casing, e.g., weighing less than 15 pounds in the disclosed embodiments. Easy terminal set up takes three minutes or less, and users plug in their own, familiar laptop for direct system access. For ease of portability, the reach-back communications terminal 100 may be associated with a carrying case, e.g., computer-style and ruggedized.

FIG. 1 is a depiction of a combination wired and wireless communication network supporting secure communications including a reach-back communications network 100, in accordance with the principles of the present invention.

In particular, as shown in FIG. 1, a combination wired and wireless communication network comprises various analog and digital communication networks 1900, such as PSTN 1901, analog communication network 1902 and digital network 1903. Devices connecting to the various digital communication networks 1900 include mobile satellite service devices 1910 connecting to a satellite service 1911, e.g., Iridium, Globalstar and INMARSAT Mini-M. Further devices connecting to the various digital communication networks 1900 include an encryptor 1920 (e.g., an FNBDT encryptor), digital cellular telephones 1930 using, e.g., GSM communication standards and digital cellular telephones 1940 connecting to a CDMA network. A tactical MSE/TRI-TAC network 1950 allows various devices to connect to the various analog and digital communication networks 1900. Devices connecting to the tactical MSE/TRI-TAC network 1950 are, e.g., JTR 1952, deployable LMR 1954 and cellular tactical STE 1956. The tactical MSE/TRI-TAC network 1950 can connect to the CDMA network. A STU-III 1970 and analog cellular telephone 1972 connect to the analog network 1902.

In accordance with the principles of the present invention, the disclosed reach-back communication terminals 100 are able to obtain a secure connection with any of the other communication devices of FIG. 1, including with each other, thus providing a flexible cross-network secure communications channel between like or differing user devices. Exemplary network communication paths include a satellite service 1911, a GSM cellular network, and a CDMA cellular network.

Figure 2A:
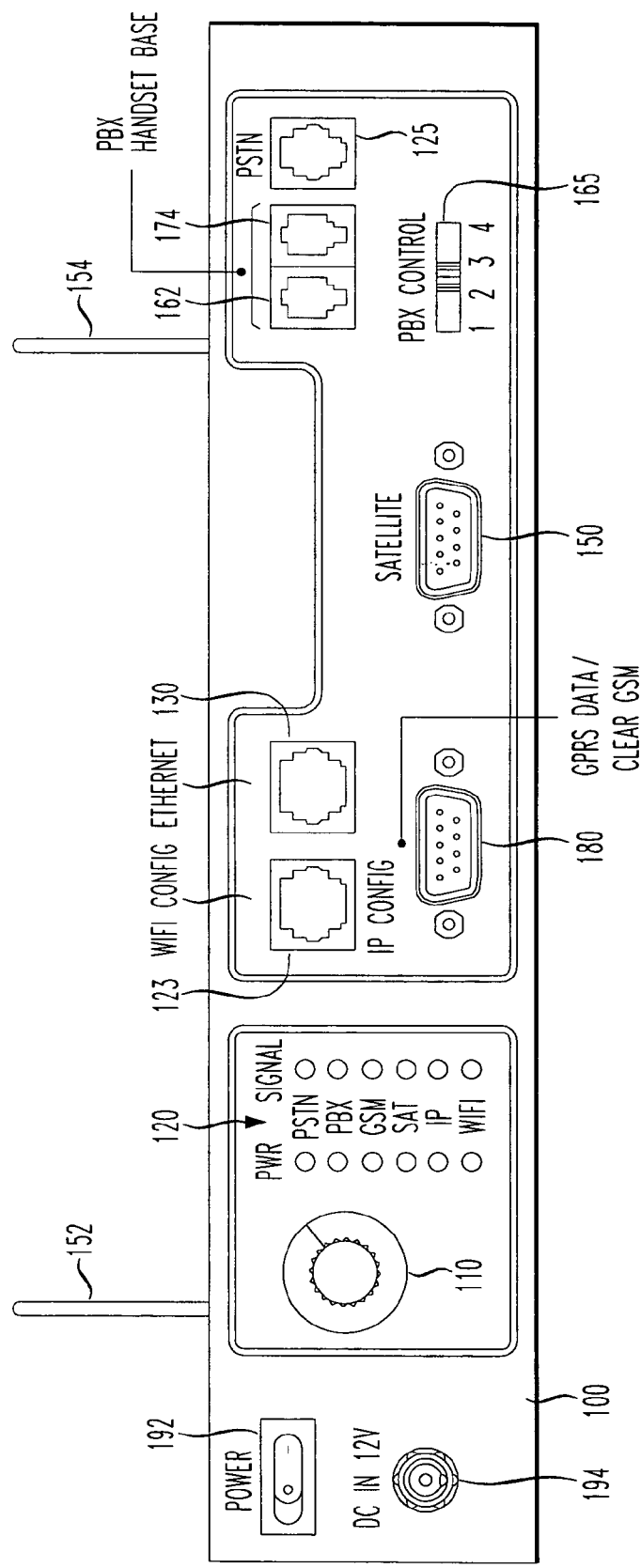
FIG. 2A shows a front panel view of the reach-back communications terminal, in accordance with the principles of the present invention.

FIG. 2A shows a front panel view of an exemplary reach-back communications terminal 100, in accordance with the principles of the present invention.

In particular, as shown in FIG. 2A, the reach-back communications terminal 100 is comprised of a network selector switch 110, status indicator lights 120, an IP Config port 123, a PSTN port 125, an Ethernet/WiFi Config port 130, a secure data OUT port to a satellite transceiver port (SDOS) 150, a PBX handset port 162, a PBX Control switch 165, a PBX base port 174, an unsecured GSM/GPRS data port 180, a power button 192, and a DC power-in connector 194.

Two antenna, antenna 152 and antenna 154, although preferably connected to the back of the reach-back communications terminal 100 are viewable from the front panel view of the reach-back communications terminal 100. Antenna 152 and antenna 154 allow transmission to and reception from a cellular telephone network, e.g., a GSM network, and a wireless fidelity (WiFi) network, respectively.

The power button 192 is used to activate internal circuitry within the reach-back communications terminal 100. The AC/DC power supply 182, shown in FIG. 4, is connectable to an AC power source 184, e.g., a conventional wall outlet, in the exemplary embodiments. Power provided by the AC power source 184 (e.g., 110/220V, 50/60 Hz) is converted to 12V DC by the AC/DC power supply 182 for connection to the DC power-in connector 194.

Alternately, a DC power source (e.g., a 12V battery pack) can be used as a power source. The DC power source, not shown, is preferably external to the housing of the reach-back communications terminal 100 to facilitate streamlined autonomy from external power sources, though an internal DC power source is within the principles of the invention. Preferably, universal power inputs/battery packs are utilized to allow for un-tethered operations and ease of replacing components.

Network selector switch 110 allows a user of the reach-back communications terminal 100 the flexibility to choose one of a plurality of data communications networks and voice communications networks. Data communications and voice can occur over any available network, e.g., Public Switched Telephone Network (PSTN), Private Branch Exchange (PBX), Global System for Mobile communications (GSM), satellite (SAT), Internet Protocol (IP) or WiFi.

The status indicator lights 120 allow an operator of the reach-back communications terminal 100 a visual verification of selection of the desired data communications circuitry and voice communications circuitry within the reach-back communications terminal 100, and a visual indication of an available signal on the selected data communications network and voice communications network.

IP Config port 123 is a non-secure connection point for a personal computer to connect to and configure the reach-back communications terminal 100 with a static IP address. For example, in instances where a dynamic address is unobtainable from a network connection, a static address will be assigned to the reach-back communications terminal 100 by an application executed on a personal computer connected to the IP Config port 123.

Ethernet/WiFi Config port 130 serves a dual purpose. Ethernet/WiFi Config port 130 is a non-secure connection point for a personal computer to connect to the reach-back communications terminal 100 to configure a WiFi connection. Alternately, a menu option on the personality faceplate 145 can be used to configure the reach-back communications terminal 100 for connection to a WiFi network. Ethernet/WiFi Config port 130 is used to connect the reach-back communications terminal 100 to a wired LAN.

The unsecured GSM/GPRS data port 180 allows users of the reach-back communications terminal 100 unencrypted access to a GSM/GPRS network if desired. Any device with the proper connector, such as a PDA or personal computer can be connected to the unsecured GSM/GPRS data port 180 to allow that device unsecured access to a GSM network and a GPRS network.

SDOS port 150 allows users of the reach-back communications terminal 100 a secure connection to a compatible satellite device. Any devices with a compatible connector, such as a satellite telephone and an Inmarsat M4 terminal, can be connected to the SDOS port 150 to allow the reach-back communications terminal 100 access to a satellite network.

PSTN port 125 allow the reach-back communications terminal 100 to be connected to a PSTN network.

PBX handset port 162 and PBX base port 174 allow respectively a handset from a conventional telephone and a handset port from a conventional telephone to be connected to the reach-back communications terminal, as shown in FIG. 6.

The PBX control switch 165 is used to switch internal circuitry within the reach-back communications terminal 100 between different modes corresponding to different types of PBX systems. The inventors have determined that currently there are essentially four predominant, different PBX types commonly found currently in use. Of course, other types of PBX systems may be implemented, perhaps requiring a switch 165 having additional positions, within the scope of the present invention.

Figure 2B:
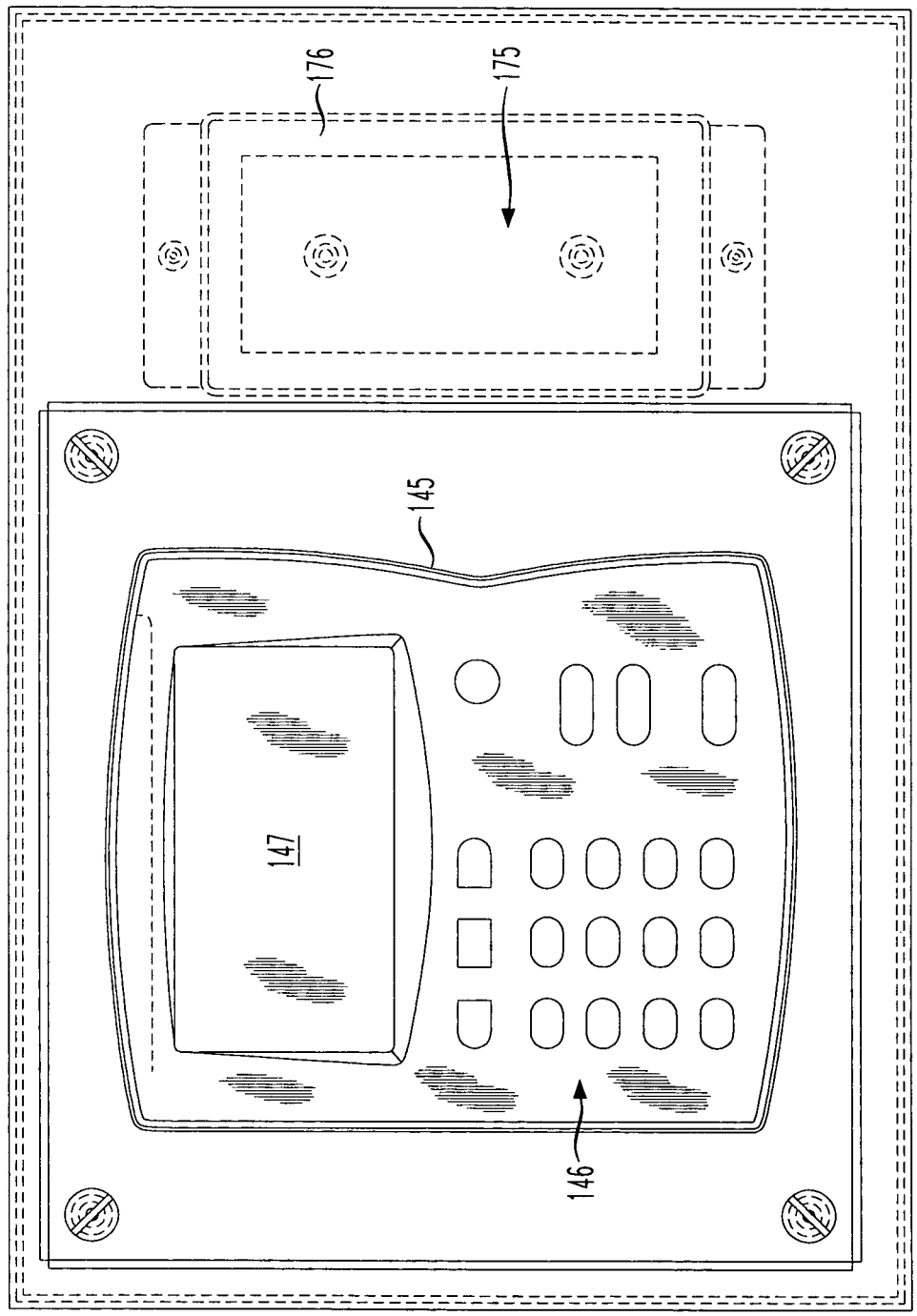
FIG. 2B shows a top panel view of the reach-back communications terminal, in accordance with the principles of the present invention.

For example, after a user connects the reach-back communications terminal 100 to a PBX wall plate 320, shown in FIG. 6, the integrated telephone handset 176, shown in FIG. 2B, may be picked up to listen for a dial tone. If no dial tone is audible, the PBX control switch 165 may be moved to another designated position until an audible dial tone is available. An audible dial tone indicates that the PBX control switch 165 is at a position of compatibility for a particular PBX network that the reach-back communications terminal 100 is currently connected to.

Likewise, network selector switch 110 is rotatable through six positions PSTN, PBX, GSM, SAT, IP and WIFI. The six positions, i.e., PSTN, PBX, GSM, SAT, IP and WIFI, correspond respectively to: PSTN communications using PSTN port 125; PBX communications using PBX base port 174; GSM communications using GSM antenna 152; SAT communications using SDOS 150; IP communications using Ethernet port 130; and WiFi communications using WiFi antenna 154.

For example, as shown in FIG. 2A, network selector switch 110 may be rotated with an indicator pointing to PSTN communications to select communications over a public switched telephone network (PSTN). With the network selector switch 110 pointing to PSTN communications, the reach-back communications terminal 100 is configured to access a PSTN through PSTN port 125.

FIG. 2B shows a top panel view of the reach-back communications terminal 100, in accordance with the principles of the present invention.

In particular, as shown in FIG. 2B, the reach-back communications terminal 100 further comprises a personality faceplate keypad 146, a personality faceplate 145, a personality faceplate display 147, an integrated telephone handset 176 and an integrated telephone handset keypad 175, The integrated telephone handset 176 and integrated telephone keypad 175 are used as conventional telephone handsets and telephone keypads in conducting telephone conversations and dialing a destination telephone number. Calls using the integrated telephone handset 176 are capable of NSA Type 1 or Type 4, 3DES and AES encryption using the encryption circuitry within the personality faceplate 145.

The personality faceplate 145 contains the necessary encryption circuitry for the reach-back communications terminal 100, fitting into a mounting area cut for the particular encryption device used (e.g., an FNBDT encryptor, a Type 4 (commercial business grade)STE, etc.). The personality faceplate 145 includes a personality faceplate keypad 146 for data entry and a personality faceplate display 147 for allowing a user to visually interface with menu options available on the personality faceplate 145.

The personality faceplate 145 is removably connected to the reach-back communications terminal 100 for convenient replacement with an alternate encryption FNBDT encryptor. Moreover, in the event that the reach-back communications terminal 100 is used in a situation where a user must protect the personality faceplate 145 from being confiscated, the personality faceplate 145 is easily removable for destruction and/or portability.

Figure 2C:
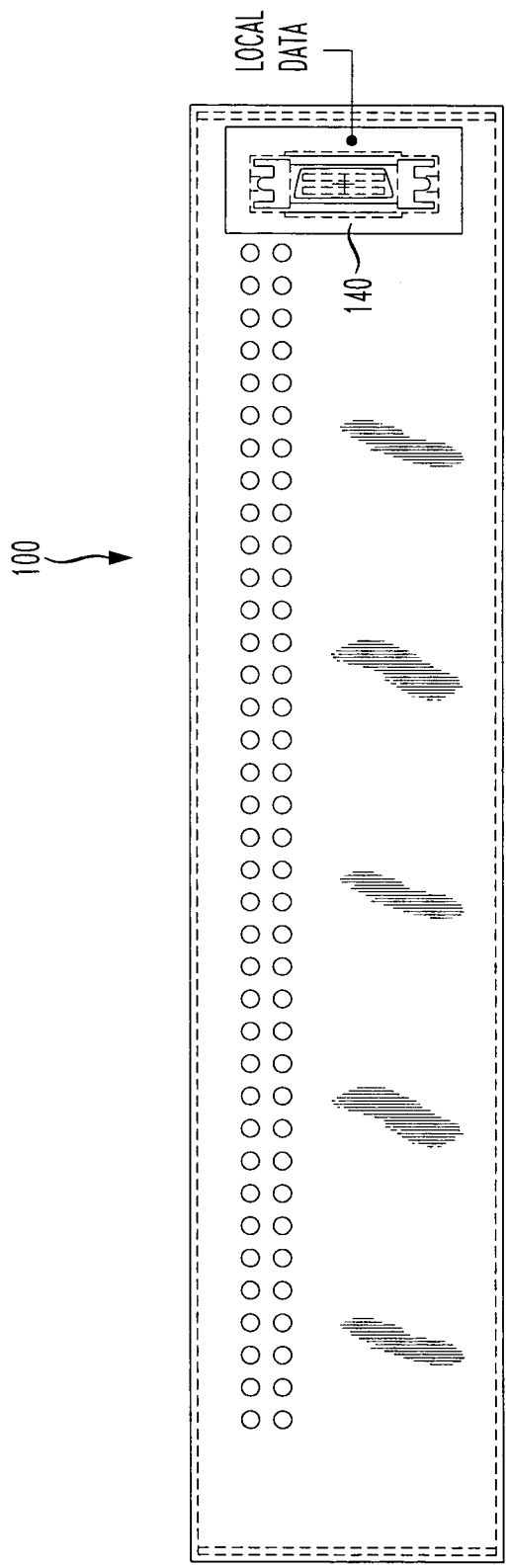
FIG. 2C shows a top/rear view of the reach-back communications terminal, in accordance with the principles of the present invention.

FIG. 2C shows a top/rear view of the reach-back communications terminal 100, in accordance with the principles of the present invention.

In particular, as shown in FIG. 2C, the reach-back communications terminal further comprises a port for connecting secure data from a PC (SDIPC) 140. The SDIPC port 140 is conveniently located on the back of the reach-back communications terminal for interconnectivity with, e.g., a desktop computer, a laptop computer, handhend computers, digital cameras, etc. Preferably, the SDIPC port 140 is an RS-232 serial port. Although an RS-232 serial port is preferable, one of ordinary skill in the art would recognize that the reach-back communications terminal 100 can utilize any of a plurality of computer interfaces without departing from the scope of the invention, e.g., a USB-port, an IEEE 1394 Firewire port, an infrared port, a parallel port, etc.

FIG. 2D(1) shows a rear cut-away view of the reach-back communications terminal, in accordance with the principles of the present invention.

In particular, as shown in FIG. 2D(1), the reach-back communications terminal further comprises a GSM personality card 800 that is accessible through GSM personality card access panel 810 inside of the reach-back communications terminal.

The GSM personality card 800 allows the reach-back communications terminal to be uniquely identified by a GSM network, the same as a conventional GSM telephone contains a personality card 809 to uniquely identify it to a GSM network.

In the event that that the GSM personality card 800 needs to be accessed, GSM personality card access panel 810 is removed. The GSM personality card is extracted from the reach-back communications terminal 100 and replaced. GSM personality card access panel 810 is re-attached to protect the GSM personality card 800.

FIG. 2D(2) shows a base cut-away view of the reach-back communications terminal, in accordance with the principles of the present invention.

In particular, as shown in FIG. 2D(2), the GSM personality card 800 is alternately viewed from the bottom of the reach-back communications terminal.

While the particular ports, personality cards and switches are shown in various locations and with various names, it will be understood by those of skill in the art that other locations on the reach-back communications terminal 100 may be suitable for any particular port and/or switch, while remaining within the scope of the present invention.

Although a GSM type personality card is discussed herein, it is preferable that any of various types of personality cards can be used with the reach-back communications terminal 100. For example, various personality cards that might be used include, e.g., TDMA, CDMA, PCS, etc. Moreover, the reach back communications terminal 100 may be adapted to accommodate a plurality of personality cards to allow for connection to a plurality of cellular networks.

Figure 3:
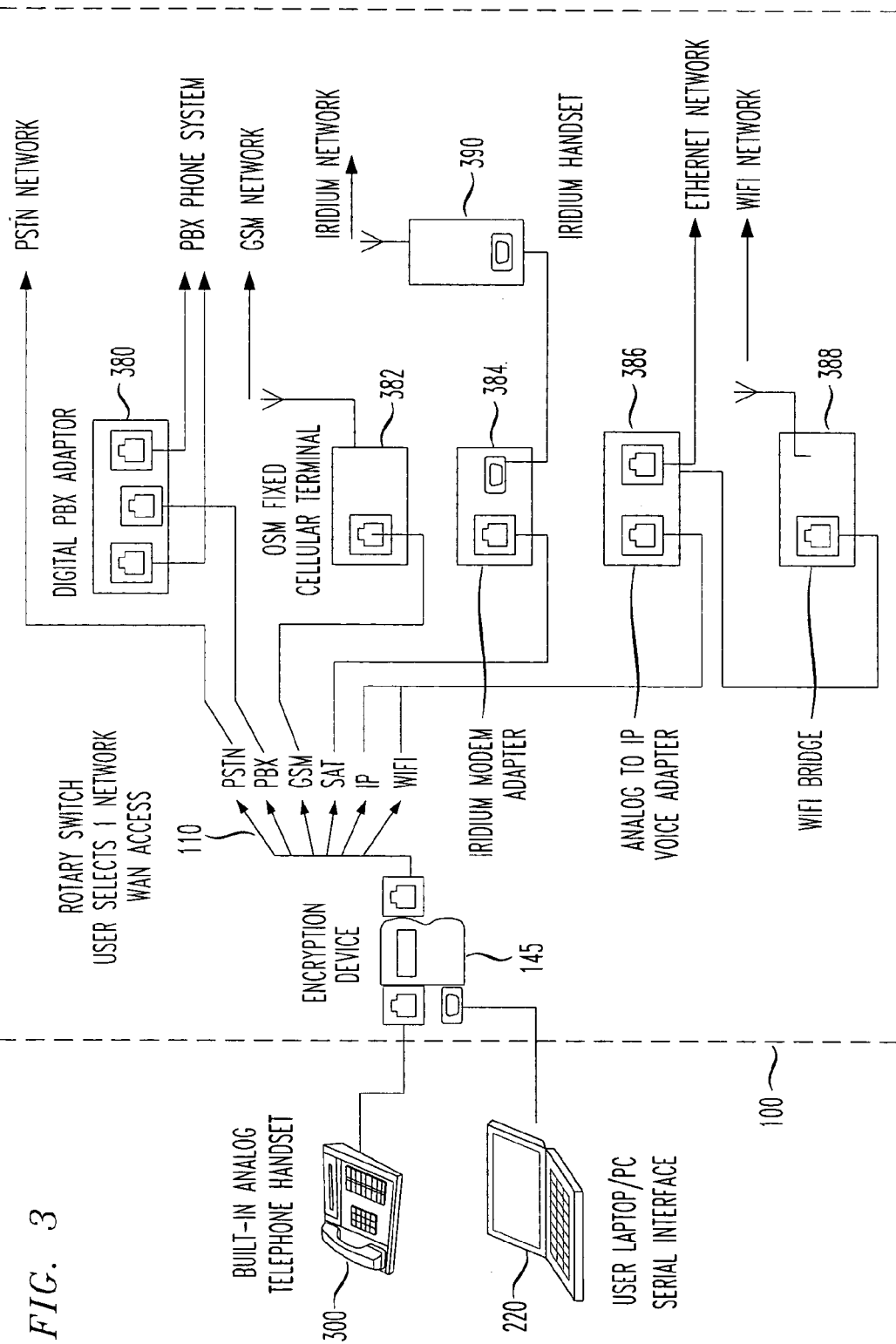
FIG. 3 shows an exemplary configuration for a reach-back communications terminal configured for access to a WAN, in accordance with the principles of the present invention.

FIG. 3 shows an exemplary configuration for a reach-back communications terminal configured for access to a WAN, in accordance with the principles of the present invention.

In particular, as shown in FIG. 3, the disclosed, exemplary reach-back communications terminal 100 further comprises accommodation for connection to a digital PBX via a digital PBX adapter 380, a GSM fixed cellular terminal 382, an Iridium modem via an Iridium modem adapter 384, an analog to IP voice channel via an analog to IP voice adapter 386, and a WiFi bridge 388.

As discussed in relation to FIG. 2A, by rotating the network selector switch 110 to one of a desired WAN, e.g., PSTN, PBX, GSM, SAT, IP and WIFI, respective components within the reach-back communication terminal are activated and internal signals are directed to communicate with the desired network. As the network selector switch 110 is rotated through positions PSTN, PBX, GSM, SAT, IP and WIFI, respective adapters digital PBX adapter 380, GSM fixed cellular terminal 382, Iridium modem adapter 384, analog to IP voice adapter 386, and a WiFi bridge 388 are activated allowing the reach-back communications terminal 100 to communicate with the chosen network.

Depending on the position of the network selector switch 110, PBX telephone deskset 300, personal computer 220 and a satellite handset 390, e.g., a Iridium handset, are selectively configured by the reach-back communications terminal 100 for communicating with a respective network.

PSTN Communications

FIG. 4 shows the disclosed embodiment of a reach-back communications terminal 100 set up to establish voice communications through a PSTN network, in accordance with the principles of the present invention In particular, as shown in FIG. 4, a PSTN network is accessed directly from the front panel of the reach-back communications terminal 100 through a PSTN wall line jack 200. The integrated telephone handset 176 is used to make unencrypted voice calls, similarly as with a conventional telephone. The integrated telephone handset keypad 175 is used to dial a target telephone number.

To establish an unencrypted voice call over a PSTN connection, network selector switch 110 is set to the PSTN position. The reach-back communications terminal 100 is connected to the PSTN wall line jack 200 by connecting a conventional PSTN cable 210 to PSTN port 125. The integrated telephone handset keypad 175 is used to dial a destination telephone number. For unencrypted voice calls, the reach-back communications terminal 100 provides not further capability than a conventional PSTN telephone.

To establish an encrypted voice call over a PSTN connection, the network selector switch 110 is set to the PSTN position. The reach-back communications terminal 100 is connected to the PSTN wall line jack 200 by connecting a conventional PSTN cable 210, e.g., an RJ-11 cable, to PSTN port 125. The integrated telephone handset keypad 175 is used to dial a destination telephone number.

To designate a PSTN voice call as being encrypted, a user of the reach-back communications terminal 100 dials a prefix before dialing a destination telephone number. For example, for a secure encrypted telephone call, a user is required to dial "02" before dialing the destination telephone number 202-555-1212. Therefore, a user of the reach-back communications terminal 100 dials 02-202-555-1212 to establish a secure encrypted PSTN voice call. If the remote end of the call is configured for "Auto Secure on Answer", the reach-back communications terminal 100 will automatically establish a secure call with the remote end of the call. Alternately, after an unencrypted PSTN voice call is established, one of the calling parties must press "SECURE" on the personality faceplate keypad 146 to change the unencrypted PSTN voice call to an encrypted PSTN voice call.

FIG. 5 shows the reach-back communications terminal 100 set up to establish data communications through a PSTN network, in accordance with the principles of the present invention.

In particular, as shown in FIG. 5, to establish an unencrypted data call over a PSTN connection, the network selector switch 110 is set to the PSTN position. A serial cable or USB cable 230 is used to connect a personal computer 220 to the SDIPC 140 of the reach-back communications terminal 100. The personal computer 220 must be set to recognize an external modem within the reach-back communications terminal 100. The personal computer 220 is used to dial into a remote site.

To establish an encrypted data call over a PSTN connection, the network selector switch 110 is set to the PSTN position. A serial cable or USB cable 230 is used to connect a personal computer 220 to the SDIPC 140 of the reach-back communications terminal 100. The personal computer 220 must be set to recognize an external modem within the reach-back communications terminal 100. A data application on the personal computer 220 is used to dial into a remote site.

If the remote end of the call is configured for "Auto Secure on Answer", the reach-back communications terminal 100 will automatically establish a secure PSTN data call between the personal computer 220 and a remote computer. Alternately, a user can toggle a "Secure Select" option on a configuration menu on the reach-back communications terminal 100. Instructions are then given to the user of the reach-back communications terminal 100 for placing an encrypted PSTN data call.

PBX Communications

FIG. 6 shows the reach-back communications terminal 100 set up to establish voice communications through a PBX network, in accordance with the principles of the present invention.

In particular, as shown in FIG. 6, a PBX is accessed by the reach-back communications terminal 100 through a PBX telephone deskset 300 connected to a PBX wall plate 320. A PBX handset cord 340, e.g., an RJ-13, conventionally connected to a PBX handset 310 is disconnected and plugging into the PBX handset port 162 on the reach-back communications terminal 100. A PBX deskset handset jack that is conventionally connected to the PBX handset 310 is instead connected to the PBX base port 174 using an appropriate cable, e.g., an RJ-13 telephone cord. The PBX telephone keypad 350 on the PBX telephone deskset 300 is used to perform dialing functions for calls using a PBX network.

Figure 6A:
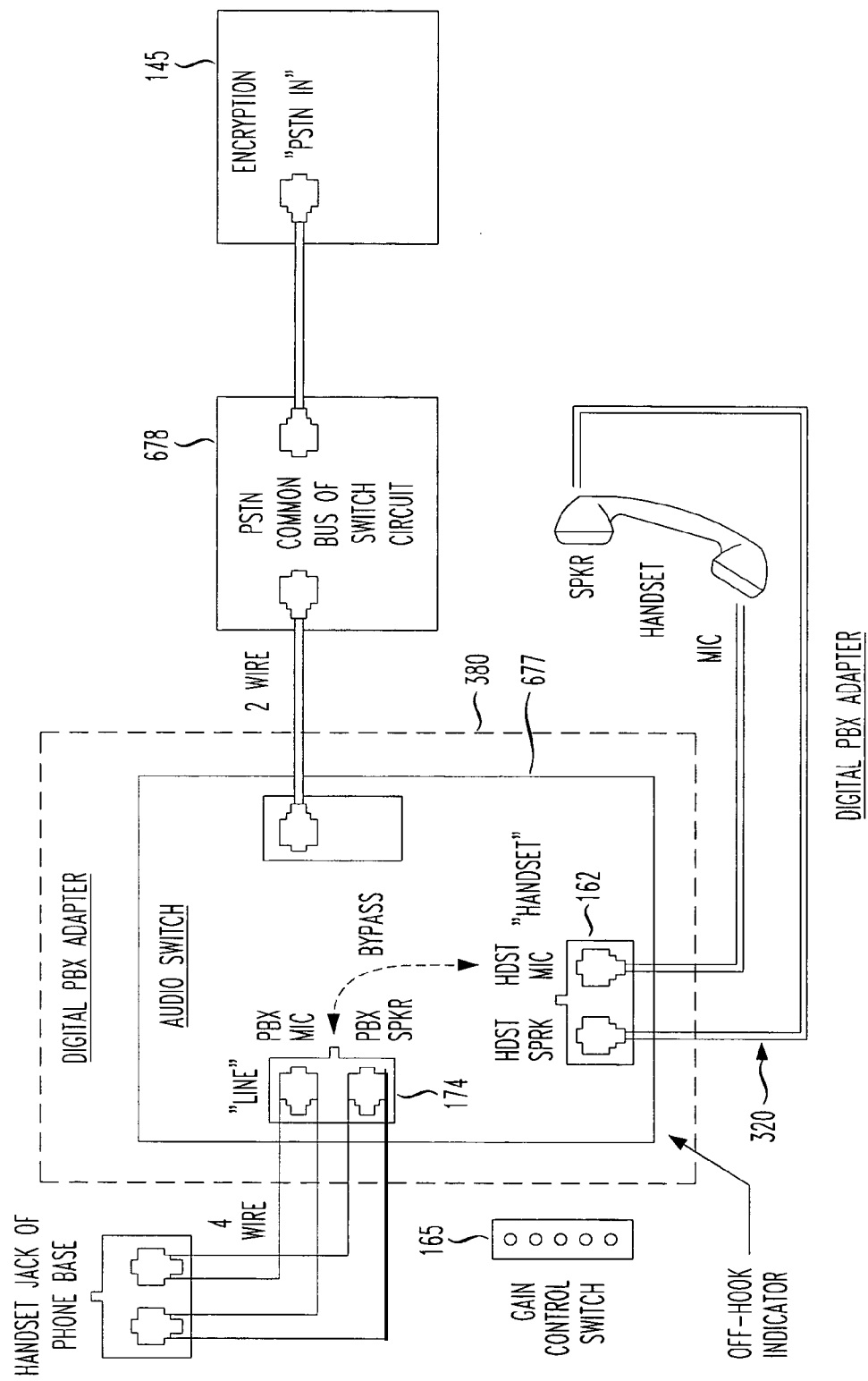
FIG. 6A depicts a digital PBX adapter connected with a PBX base unit, the handset of the PBX base unit, and a PSTN common bus/circuit switch connected in turn to an encryption unit, in accordance with the principles of the present invention.

FIG. 6A depicts a digital PBX adapter connected with a PBX base unit, the handset of the PBX base unit, and a PSTN common bus/circuit switch connected in turn to an encryption unit, in accordance with the principles of the present invention.

In particular, as shown in FIG. 6A, the reach-back communications terminal 100 includes a digital PBX adapter 380 comprised largely of an audio switch 677. The audio switch 677 has an adjustable output gain, controlled by the 4-position switch 165. The adjustable gain is formed using, e.g., a well known resistor ladder circuit. While the adjustable gain control switch 165 in the exemplary embodiment has 4 positions, in graduated gain increments, more (or even fewer) gain selections within the audio switch 677 are also contemplated within the principles of the present invention.

The correct position of the adjustable gain switch 165 is empirically determined. The user will hear a reverb effect in the headset based on the volume capability of the PBX system. The FNBDT encryptor of the reach-back communications terminal 100 won't be able to establish modem communications with another FNBDT or STE encryptor if the PBX adjustable gain control switch is not properly set.

In the given embodiment, the gain control switch 165 is initially set in a common position (e.g., position 3). If the FNBDT encryptor is able to establish communications, then the setting is proper. If not, then the user manually switches the position of the gain control switch 165 to, e.g., position 2, and tries again to establish secure communications again. Again, if the communications are established, then position 2 is proper for the particular PBX being used. If not, then the user may manually move the gain control switch to, e.g., position 1 and try again. Position 4 may be tried after position 1.

The particular order of positions of the gain control switch 165 are for exemplary purposes only.

The LINE phone jack 174 of the digital PBX adapter 380 is wired to the vacated handset jack on the phone base unit using, e.g., a standard coiled handset cord. The handset that was disconnected from the base unit is then rewired into the HANDSET phone jack 162 of the digital PBX adapter 380 using, e.g., a standard coiled handset cord.

The output of the audio switch 677 is connected internal to the reach-back communications terminal 100 to a PSTN common bus of a switching circuit 678, which in the PBX mode switches a 2-wire connection from the digital PBX adapter 380 to the PSTN IN input of the encryption device 145 (i.e., FNBDT encryptor). Other inputs to the PSTN common bus of the switch circuit 678 (e.g., GSM modem, etc.) are not shown in FIG. 6A for simplicity.

When the handset of the PBX is in an OFF hook condition, in an unsecure mode, then optical relays close to cause a bypass in the audio switch 677. Thus, in the OFF hook condition, the PBX handset can be used to communicate with its handset base in an otherwise conventional fashion. Encrypted communications may take place through the FNBDT encryptor.

To make an unsecured PBX voice call, the reach-back communications terminal 100 does not provide any further capability beyond using the PBX telephone deskset 300. The integrated telephone handset 176 is used to dial a destination telephone number and converse with a called party.

To make a secured PBX voice call, the network selector switch 110 is set to the PBX position. The PBX handset 310 is taken off-hook. The PBX telephone keypad 350 is used to dial a destination telephone number. Once a call is established with a destination telephone number, the integrated telephone handset 176 is used to converse with the called party If the remote end of the call is configured for "Auto Secure on Answer", the reach-back communications terminal 100 will automatically establish a secure PBX call with the remote end of the call. Alternately, after an unencrypted call is established, one of the calling parties must press "SECURE" on the personality faceplate keypad 146 to change an unencrypted PBX call to a secure encrypted mode.

FIG. 7 shows the reach-back communications terminal 100 set up to establish data communications through a PBX network, in accordance with the principles of the present invention.

In particular, as shown in FIG. 7, to make an unsecured PBX data call, the network selector switch 110 is set to the PBX position. A menu option on the personality faceplate 145 is chosen to allow unencrypted data communications. A PBX network is accessed by the personal computer 220 through the reach-back communications terminal 100 through the PBX telephone deskset 300 connected to a PBX wall plate 320. The PBX handset cord 340 connected to a PBX handset 310 is disconnected and plugging into the PBX handset port 162 on the reach-back communications terminal 100. A PBX deskset handset jack that is conventionally connected to the PBX handset 310 is instead connected to the PBX base port 174 using an appropriate cable, e.g., an RJ-13 telephone cord. Personal computer 220 is connected to the SDIPC 140 using a serial cable or USB cable 230.

Both the integrated telephone handset 176 and the PBX handset 310 are left off-hook. The personal computer 220 must be set to recognize an external modem within the reach-back communications terminal 100. The PBX telephone keypad 350 is used to dial a destination telephone number. After dialing the destination telephone number on the PBX telephone keypad 350, a data application on the personal computer 220 is initiated to make a data link call.

To make an encrypted PBX data call, the network selector switch 110 is set to the PBX position. The PBX handset 310 is disconnected from the PBX telephone unit's handset jack and connected to the reach-back communications terminal's 100 PBX handset port 162. The PBX telephone unit's 300 handset jack is connected to the reach-back communications terminal's 100 PBX base port 174 using an appropriate cable, e.g., an RJ-13 telephone cord. The personal computer 220 is connected to the SDIPC 140 using cable 230. Both the integrated telephone handset 176 and the PBX telephone handset 310 are left off-hook.

The personal computer 220 must be set to recognize an external modem within the reach-back communications terminal 100. The PBX telephone keypad 350 is used to dial a destination telephone number. After dialing the destination telephone number on the PBX keypad 350, a data application on the personal computer 220 is initiated to make a data link call.

If the remote end of the call is configured for "Auto Secure on Answer", the reach-back communications terminal 100 will automatically establish a secure PBX data call between the personal computer 220 and a remote computer. Alternately, a user can toggle a "Secure Select" option on a configuration menu on the reach-back communications terminal 100. Instructions are then given to the user of the reach-back communications terminal 100 for placing an encrypted PBX data call.

GSM Communications

FIG. 8 shows the reach-back communications terminal 100 set up to establish voice communications through a GSM network, in accordance with the principles of the present invention.

In particular, as shown in FIG. 8, the GSM antenna 152 allows cellular communications to be established using any of four cellular frequencies. In particular, the GSM antenna 152 allows communications at frequencies of 850 MHz at 2.2 dBi, 900 MHz at 2.2 dBi, 1800 MHz at 3 dBi and 1900 MHz at 3 dBi over approved circuit-switched digital networks.

To initiate a secure call over a data network and not a GPRS network, a number designation proceeds the entry of a telephone number, e.g., "*02*". To receive a secure message, the call initiator must use a designated number assigned to the reach-back communications terminal 100. The reach-back communications terminal 100 conveniently has a separate non-secure GSM/GPRS data port 180 to allow users unencrypted access to a GPRS network if desired.

To establish an unencrypted voice call using a GSM network, the network selector switch 110 is set to the GSM position. The GSM antenna 152 is set up to optimize communications with a GSM network. The status indicator lights 120 will indicate that the reach-back communications terminal 100 is receiving a GSM signal. To allow a user of the reach-back communications terminal 100 to determine the strength of the signal, an LED indicator on the status indicator lights 120 will flash sequentially from one to four times to indicate the strength of the GSM signal. Alternately, a solid non-flashing LED indicator on the status indicator lights 120 will indicate a strong signal.

The integrated telephone handset 176 and the integrated telephone handset keypad 175 are used to dial and conduct conversations during an unencrypted voice call established over a GSM network.

To establish an encrypted GSM voice call, the network selector switch 110 is set to the GSM position. The GSM antenna 152 is set up to optimize communications with a GSM network. The status indicator lights 120 will indicate that the reach-back communications terminal 100 is receiving a GSM signal. To allow a user of the reach-back communications terminal 100 to determine the strength of the signal, an LED indicator on the status indicator lights 120 will flash sequentially from one to four times to indicate the strength of the GSM signal. Alternately, a solid non-flashing LED indicator on the status indicator lights 120 will indicate a strong signal.

The integrated telephone handset 176 and the integrated telephone handset keypad 175 are used to dial and conduct conversations during an encrypted telephone call established over a GSM network. To designate a telephone call as being encrypted, a user of the reach-back communications terminal 100 dials a prefix before dialing a destination telephone number. For example, for a secure encrypted telephone call, a user is required to dial "*02*" before dialing the destination telephone number 202-555-1212. Therefore a user of the reach-back communications terminal 100 dials 02-202-555-1212 to establish a secure encrypted telephone call. If the remote end of the call is configured for "Auto Secure on Answer", the reach-back communications terminal 100 will automatically establish a secure call with the remote end of the call.

FIG. 9 shows the reach-back communications terminal 100 set up to establish non-secure data communications through a GSM network, in accordance with the principles of the present invention.

In particular, as shown in FIG. 9, to establish an unencrypted GSM data call, the network selector switch 110 is set to the GSM position. The GSM antenna 152 is set up to optimize communications with a GSM network. The status indicator lights 120 will indicate that the reach-back communications terminal 100 is receiving a GSM signal. To allow a user of the reach-back communications terminal 100 to determine the strength of the signal, an LED indicator on the status indicator lights 120 will flash sequentially from one to four times to indicate the strength of the GSM signal. Alternately, a solid non-flashing LED indicator on the status indicator lights 120 will indicate a strong signal.

Personal computer 220 is connected to the SDIPC 140 by a serial cable or a USB cable 230. A data application on the personal computer 220 dials into a remote site, with a remote site answering the call with a corresponding data application.

FIG. 10 shows the reach-back communications terminal 100 set up to establish secure data communications through a GSM network, in accordance with the principles of the present invention.

In particular, as shown in FIG. 10, to establish an encrypted GSM data call, the network selector 110 is set to the GSM position. A serial cable or USB cable 230 is used to connect the personal computer 220 to the SDIPC 140. The GSM antenna 152 is set up to optimize communications with a GSM network. The status indicator lights 120 will indicate that the reach-back communications terminal 100 is receiving a GSM signal. To allow a user of the reach-back communications terminal 100 to determine the strength of the signal, an LED indicator on the status indicator lights 120 will flash sequentially from 1 to 4 times to indicate the strength of the GSM signal. Alternately, a solid non-flashing LED indicator on the status indicator lights 120 will indicate a strong signal.

A data application on the personal computer 220 is used to dial a remote site. The data application dials a prefix to designate a telephone call as being encrypted. For example, for a secure encrypted telephone call, the data application is required to dial "*02*" before dialing the destination telephone number 202-555-1212. Therefore the data application dials 02-202-555-1212 to establish a secure encrypted telephone call. If the remote end of the call is configured for "Auto Secure on Answer", the reach-back communications terminal 100 will automatically establish a secure call with the remote end of the call. Alternately, when an encrypted call is received, the receiving party must press "SECURE" on the personality faceplate keypad 146 to receive an encrypted GSM call.

IP Communications

FIG. 11 shows the reach-back communications terminal 100 set up to establish IP voice communications over an IP network, in accordance with the principles of the present invention.

In particular, as shown in FIG. 11, ethernet port 130 allows the reach-back communications terminal 100 to connection over any IP network, preferably supporting Dynamic Host Configuration Protocol (DHCP) addressing. Alternately, the reach-back communications terminal 100 can utilize a static IP address. To obtain a dynamically assigned IP address once connected to an IP network, the reach-back communications terminal 100 requests an IP address from the network. Alternately, a static IP address can be assigned to the reach-back communications terminal 100 for connection to an IP network.

To establish an IP unencrypted voice call using an IP connection, the network selector switch 110 is set to the IP position. Ethernet port 130 is connected to a conventional local area network (LAN) wall plate 600 using an appropriate cable, e.g., CAT 5, CAT 6, etc. The integrated telephone handset keypad 175 is used to dial a destination telephone number.

To designate a higher rate codec for the unencrypted IP voice call, a user of the reach-back communications terminal 100 dials a prefix before dialing a destination telephone number. For example, to designate a higher rate codec, a user is required to dial "991" before dialing the destination telephone number 202-555-1212. Therefore a user of the reach-back communications terminal 100 dials 991-202-555-1212 to establish an IP voice call using a higher rate codec.

To establish an IP encrypted voice call using an IP connection, the network selector switch 110 is set to the IP position. Ethernet port 130 is connected to a LAN wall plate 600 using an appropriate cable, e.g., CAT 5, CAT 6, etc. The integrated telephone handset keypad 175 is used to dial a destination telephone number.

To designate a higher rate codec for the IP encrypted voice call, a user of the reach-back communications terminal 100 dials a prefix before dialing a destination telephone number. For example, to designate a higher rate codec, a user is required to dial "991" before dialing the destination telephone number 202-555-1212. Therefore a user of the reach-back communications terminal 100 dials 991-202-555-1212 to establish an encrypted IP voice call using a higher rate codec.

If the remote end of the call is configured for "Auto Secure on Answer", the reach-back communications terminal 100 will automatically establish a secure call with the remote end of the call.

FIG. 12 shows the reach-back communications terminal 100 set up to establish IP data communications over an IP network, in accordance with the principles of the present invention.

In particular, as shown in FIG. 12, to establish an IP unencrypted data call using an IP connection, the network selector switch 110 is set to the IP position. The Ethernet port 130 is connected to a LAN wall plate 400 using an appropriate cable, e.g., CAT 5, CAT 6, etc. A serial cable or USB cable 230 is used to connect the personal computer 220 to the SDIPC 140 of the reach-back communications terminal 100. The personal computer 220 must be set to recognize an external modem within the reach-back communications terminal 100.

A menu option on the personality faceplate 145 is chosen to enable an unsecured data call. A data application on the personal computer 220 is used to dial a destination telephone number.

To designate a higher rate codec for the IP data call, the data application on the reach-back communications terminal 100 dials a prefix before dialing a destination telephone number. For example, to designate a higher rate codec, the data application is required to dial "991" before dialing the destination telephone number 202-555-1212. Therefore, the data application on the reach-back communications terminal 100 dials 991-202-555-1212 to establish an IP data call using a higher rate codec.

To establish an IP encrypted data call using an IP connection, the network selector switch 110 is set to the IP position. The Ethernet port 130 on the reach-back communications terminal 100 is connected to a LAN wall plate 400 using an appropriate cable. The integrated telephone handset's 176 integrated telephone handset keypad 175 is used to dial a destination telephone number.

To designate a higher rate codec for the IP encrypted data call, a user of the reach-back communications terminal 100 dials a prefix before dialing a destination telephone number.

For example, to designate a higher rate codec, a user is required to dial "991" before dialing the destination telephone number 202-555-1212. Therefore a user of the reach-back communications terminal 100 dials 991-202-555-1212 to establish IP data call using a higher rate codec.

If the remote end of the call is configured for "Auto Secure on Answer", the reach-back communications terminal 100 will automatically establish a secure call with the remote end of the call.

WiFi Communications

FIG. 13 shows the reach-back communications terminal 100 set up to establish WiFi voice communications over a WiFi network, in accordance with the principles of the present invention.

In particular, as shown in FIG. 13, the WiFi antenna 154 connects to WiFi circuity within reach-back communications terminal 100 that allows WiFi communications using a WiFi frequency, e.g. 2400 MHz at 3 dBi. A WiFi interface allows the reach-back communications terminal 100 to establish a secure connection over any IP network, preferably supporting DHCP addressing. Alternately, a static IP address can be assigned to the reach-back communications terminal 100 for connection to an IP network.

To obtain a dynamically assigned IP address once connected to a WiFi network, a WiFi bridge within the reach-back communications terminal 100 requests an IP address from a WiFi network. Secure communications are conducted over the WiFi network using Vonage voice-over-IP (VoIP) service for both voice and data.

To establish a WiFi unencrypted voice call using a WiFi connection, the network selector switch 110 is set to the WiFi position. The WiFi antenna 154 is set up to optimize communications with a WiFi network. The status indicator lights 120 will indicate that the reach-back communications terminal 100 is receiving a WiFi signal. The reach-back communications terminal 100 will automatically pick up an IP address from the WiFi network, possibly taking several minutes. Once a dial tone is available on the integrated telephone handset 176, a destination telehphone number is dialed using the integrated telephone handset keypad 175 to established a call over a WiFi network.

To designate a higher rate codec for the WiFi voice call, a user of the reach-back communications terminal 100 dials a prefix before dialing a destination telephone number. For example, to designate a higher rate codec, a user is required to dial "991" before dialing the destination telephone number 202-555-1212. Therefore a user of the reach-back communications terminal 100 dials 991-202-555-1212 to establish a WiFi voice call using a higher rate codec.

To establish a WiFi encrypted voice call using a WiFi connection, the network selector switch 110 is set to the WiFi position. The WiFi antenna 154 is set up to optimize communications with a WiFi network. The status indicator lights 120 will indicate that the reach-back communications terminal 100 is receiving a WiFi signal. The reach-back communications terminal 100 will automatically pick up an IP address from the WiFi network, possibly taking several minutes.

The integrated telephone handset keypad 175 and the integrated telephone handset 176 are used to dial and conduct conversations during an encrypted voice call established over a WiFi network.

To designate a higher rate codec for the WiFi encrypted voice call, a user of the reach-back communications terminal 100 dials a prefix before dialing a destination telephone number. For example, to designate a higher rate codec, a user is required to dial "991" before dialing the destination telephone number 202-555-1212. Therefore a user of the reach-back communications terminal 100 dials 991-202-555-1212 to establish a WiFi encrypted voice call using a higher rate codec.

If the remote end of the call is configured for "Auto Secure on Answer", the reach-back communications terminal 100 will automatically establish a secure call with the remote end of the call.

FIG. 14 shows the reach-back communications terminal 100 set up to establish WiFi data communications over a WiFi network, in accordance with the principles of the present invention.

In particular, as shown in FIG. 14, to establish a WiFi unencrypted data call using a WiFi connection, the network selector switch 110 is set to the WiFi position. A menu option on the personality faceplate 145 is chosen to allow unencrypted data communications. The WiFi antenna 154 is set up to optimize communications with a WiFi network. The status indicator lights 120 will indicate that the reach-back communications terminal 100 is receiving a WiFi signal. The reach-back communications terminal 100 will automatically pick up an IP address from the WiFi network, possibly taking several minutes. A serial cable or USB cable 230 is used to connect the personal computer 220 to the SDIPC port 140.

To designate a higher rate codec for the WiFi data call, a user of the reach-back communications terminal 100 dials a prefix before dialing a destination telephone number. For example, to designate a higher rate codec, a user is required to dial "991" before dialing the destination telephone number 202-555-1212. Therefore, a user of the reach-back communications terminal 100 dials 991-202-555-1212 to establish a WiFi data call using a higher rate codec.

To establish a WiFi encrypted data call using a WiFi connection, the network selector switch 110 is set to the WiFi position. The WiFi antenna 154 is set up to optimize communications with a WiFi network. The status indicator lights 120 will indicate that the reach-back communications terminal 100 is receiving a WiFi signal. The reach-back communications terminal 100 will automatically pick up an IP address from the WiFi network, possibly taking several minutes. A serial cable or USB cable 230 is used to connect the personal computer 220 to the SDIPC 140.

If the remote end of the call is configured for "Auto Secure on Answer", the reach-back communications terminal 100 will automatically establish a secure call with the remote end of the call.

To designate a higher rate codec for the WiFi encrypted data call, a user of the reach-back communications terminal 100 dials a prefix before dialing a destination telephone number. For example, to designate a higher rate codec, a user is required to dial "991" before dialing the destination telephone number 202-555-1212. Therefore a user of the reach-back communications terminal 100 dials 991-202-555-1212 to establish a WiFi encrypted data call using a higher rate codec.

SAT Communications

Figure 15:
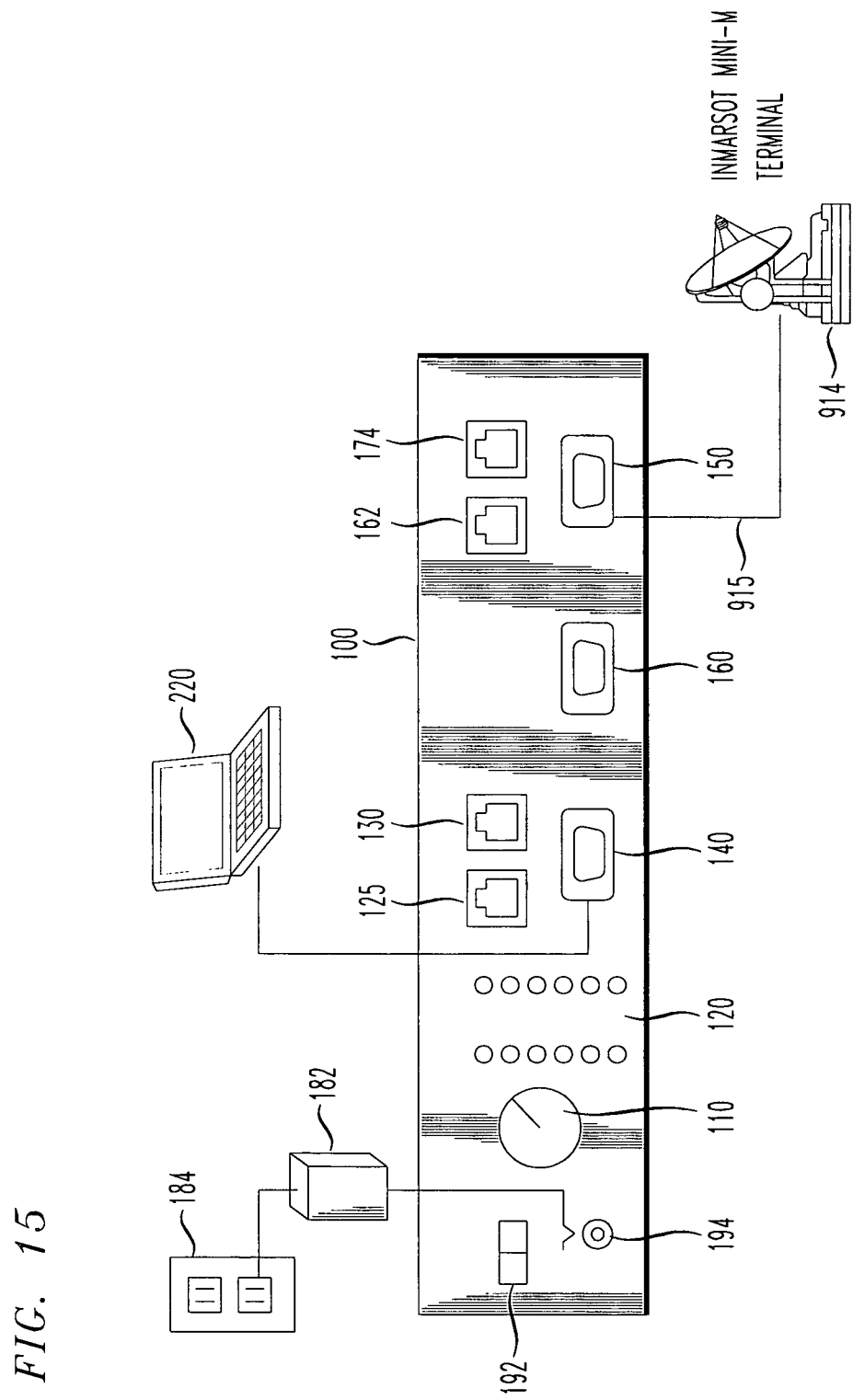
FIG. 15 shows the reach-back communications terminal set up to establish satellite voice communications over a satellite network, in accordance with the principles of the present invention.

FIG. 15 shows the reach-back communications terminal 100 set up to establish satellite voice communications over a satellite network, in accordance with the principles of the present invention.

A satellite communications link allows a secure connection for both voice and data. The reach-back communications terminal 100 can interface with any satellite interface that accepts AT command input, e.g., Iridium, Inmarsat Mini-M, Globalstar, etc. The reach-back communications terminal 100 eliminates the need to dial into a red switch for Iridium, as is necessary with the GD Iridium Secure Module (ISM). Although a satellite telephone 390 is shown in FIG. 3, any data transceiver, e.g., a cellular telephone, is connectable to SDOS port 150 that is compatible with the particular connection used, e.g., a serial connection.

In particular, as shown in FIG. 15, to make an unsecured SAT voice call, the reach-back communications terminal 100 does not provide any further capability beyond using the satellite handset 390.

To establish a secured satellite voice call using a satellite connection, the network selector switch 110 is set to the SAT position. Satellite transceiver 914 is connected to the SDOS port 150 using an appropriate cable 915, e.g., a serial cable. A keypad on the satellite transceiver is used to dial a destination telephone number.

Once a connection is established with a destination telephone number, the integrated telephone handset 176 is used to conduct conversations over the satellite network. If the remote end of the call is configured for "Auto Secure on Answer", the reach-back communications terminal 100 will automatically establish a secure call with the remote end of the call.

To designate a higher rate codec for the satellite encrypted voice call, a user of the reach-back communications terminal 100 dials a prefix before dialing a destination telephone number. For example, to designate a higher rate codec, a user is required to dial "991" before dialing the destination telephone number 202-555-1212. Therefore a user of the reach-back communications terminal 100 dials 911-202-555-1212 to establish a satellite voice call using a higher rate codec.

To make an unsecured satellite data call, the network selector switch 110 is set to the SAT position. The satellite network is accessed by the personal computer 220 through the reach-back communications terminal 100 through the satellite telephone 390. Personal computer 220 is connected to the SDIPC 140 using a serial cable or USB cable 230. The personal computer 220 must be set to recognize an external modem within the reach-back communications terminal 100.

A menu option on the personality faceplate 145 is chosen to enable an unsecured data call. The satellite telephone keypad 520 is used to dial a destination telephone number. After dialing the destination telephone number on a satellite transceiver keypad, the personal computer 220 is initiated to make a data link call.

To make an encrypted satellite data call, the network selector switch 110 is set to the SAT position. The personal computer 220 is connected to the SDIPC 140. The personal computer 220 must be set to recognize an external modem within the reach-back communications terminal 100. A satellite transceiver keypad is used to dial a destination telephone number. After dialing the destination telephone number on the satellite transceiver keypad, a data application on the personal computer 220 is initiated to make a data link call.

If the remote end of the call is configured for "Auto Secure on Answer", the reach-back communications terminal 100 will automatically establish a secure satellite data call between the personal computer 220 and a remote computer.

FIG. 16 shows exemplary data rates for the different types of communication networks available with use on the disclosed reach-back communication terminal 100, in accordance with the principles of the present invention. The maximum data rate on any given communication network is dependent on the type of encryption used, as shown.

Figure 17:
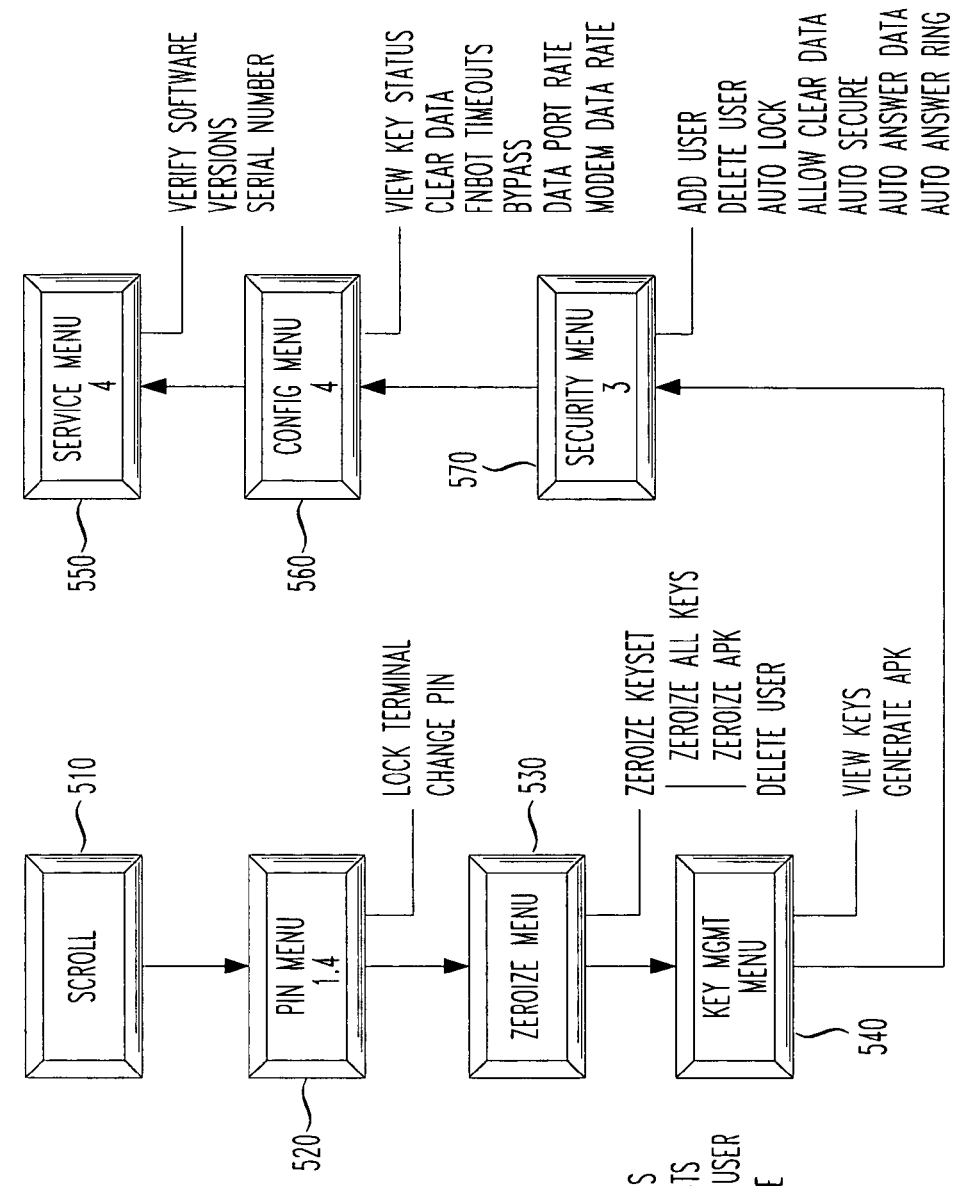
FIG. 17 shows keys available on the personality faceplate keypad, in accordance with the principles of the present invention.
Figure 18:
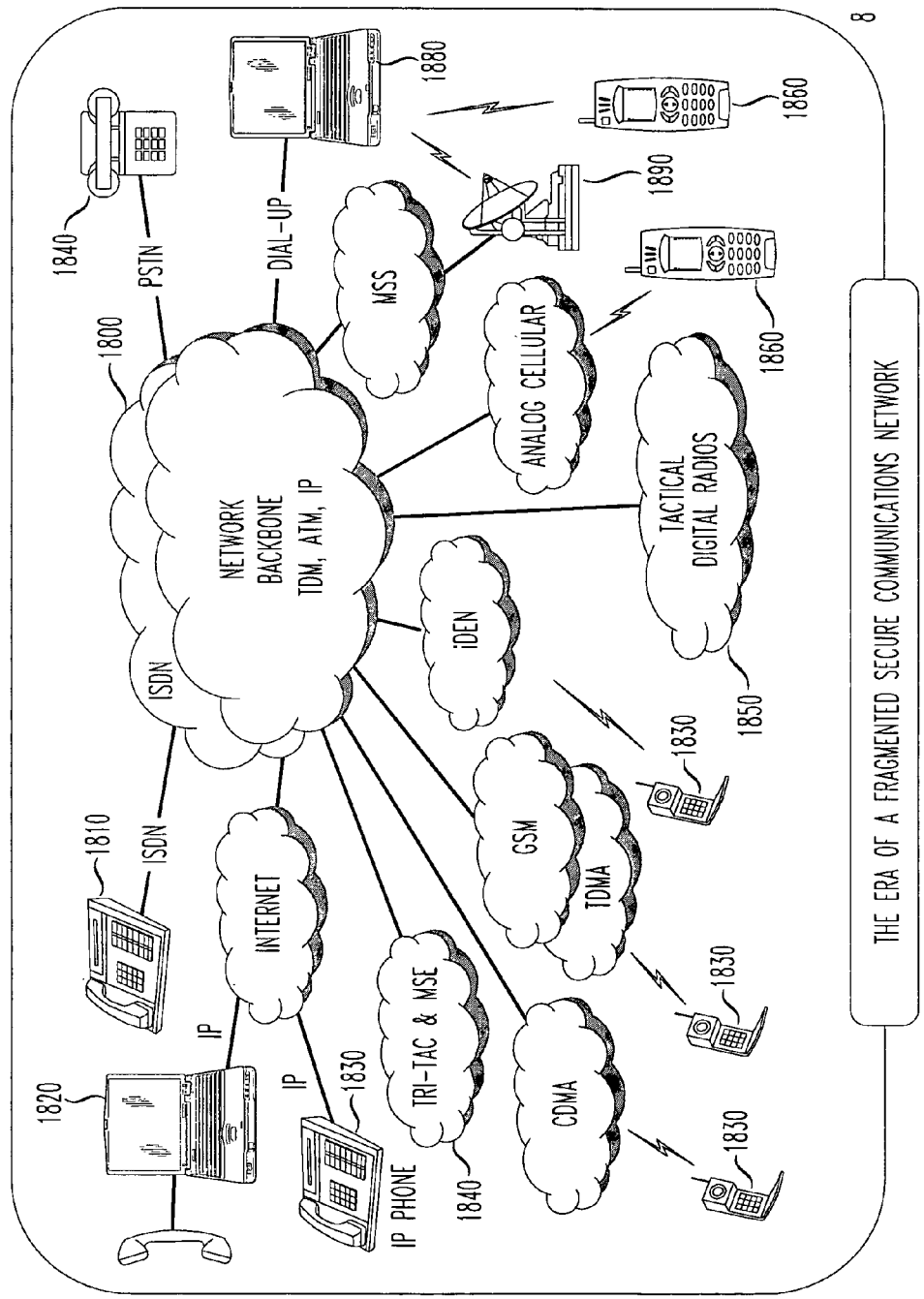
FIG. 18 shows a conventional fragmented secure communications network.
Figure 19:
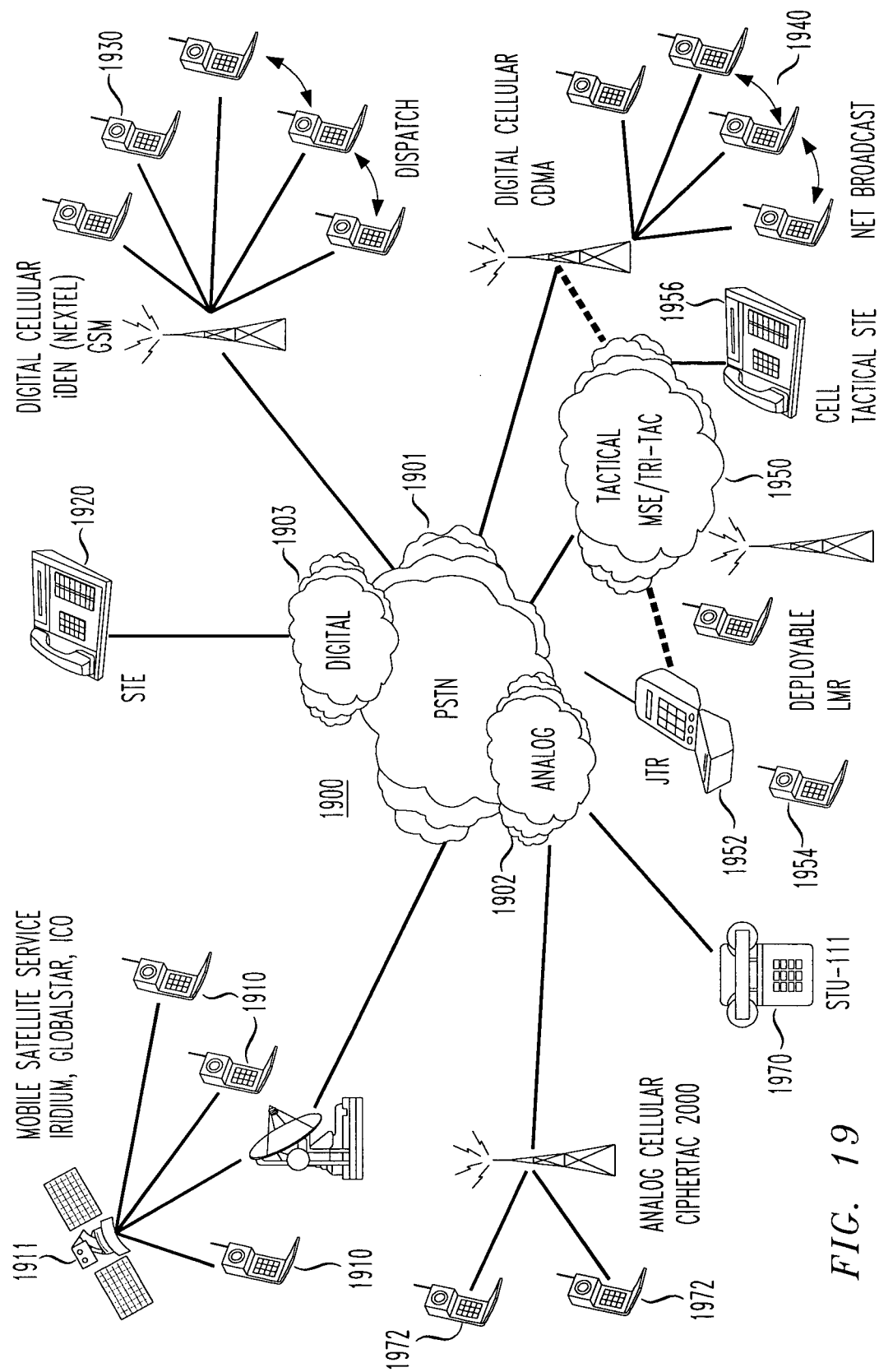
FIG. 19 shows a conventional combination wired and wireless communication network supporting secure communications.
Figure 20:
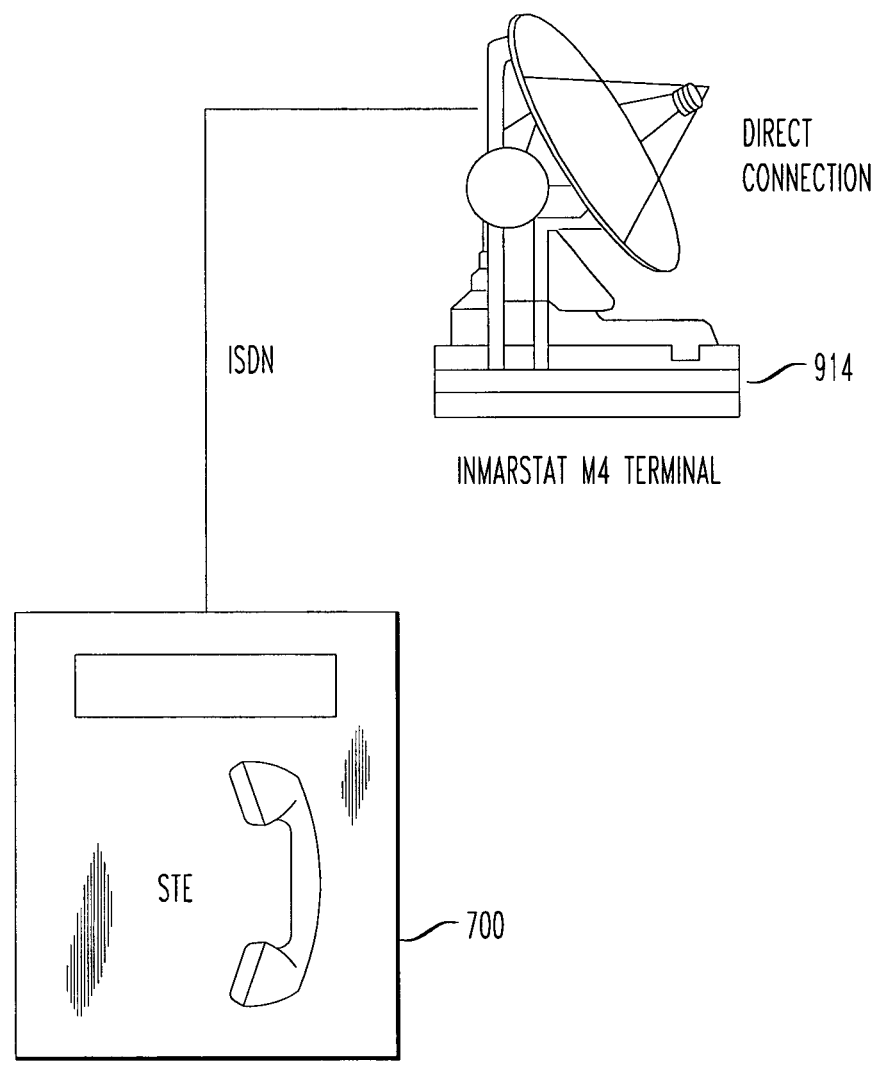
FIG. 20 shows a conventional deployable secure communication system utilizing a satellite communication network.
Figure 21:
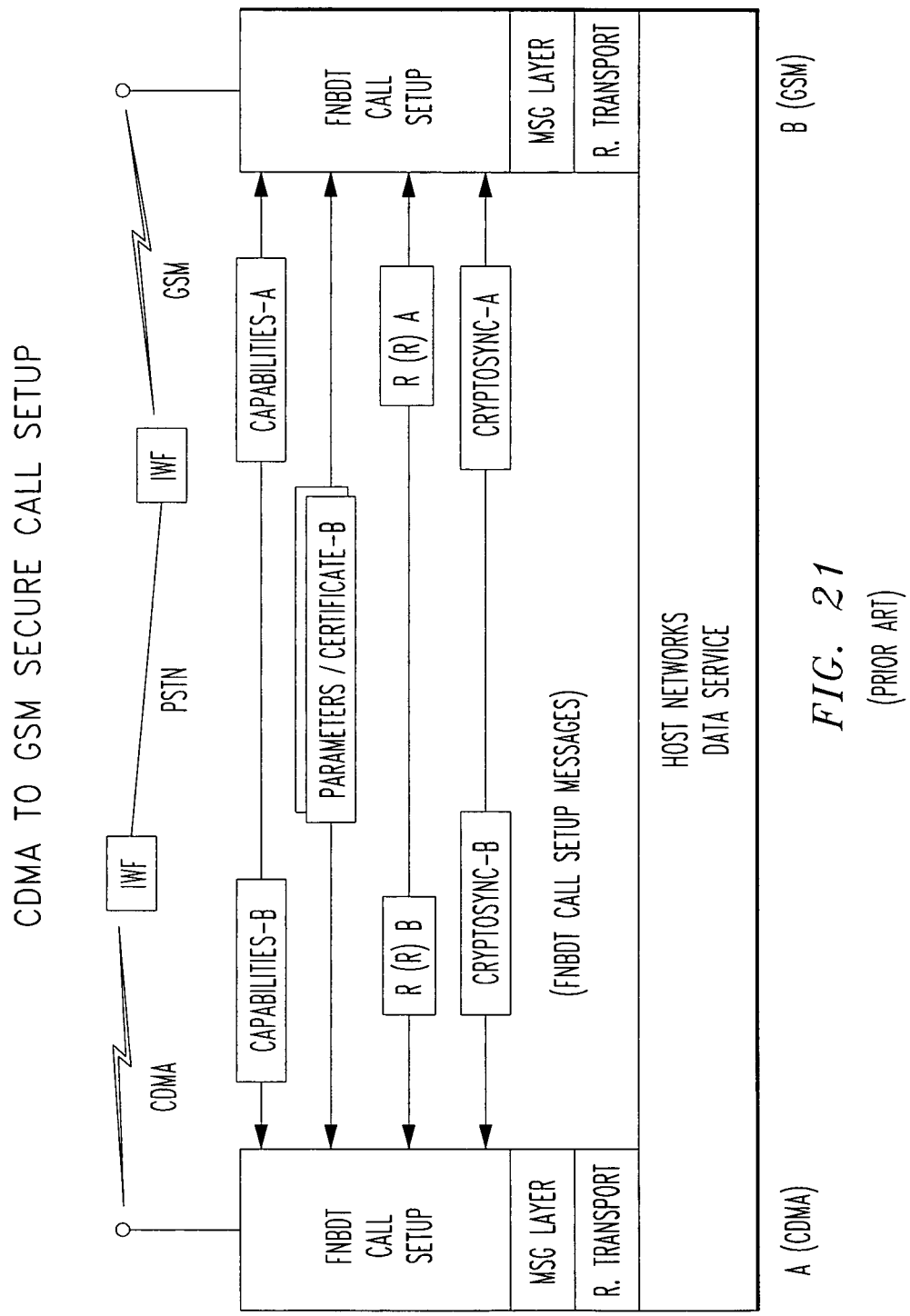
FIG. 21 shows a conventional CDMA to GSM secure call setup.
Figure 22:
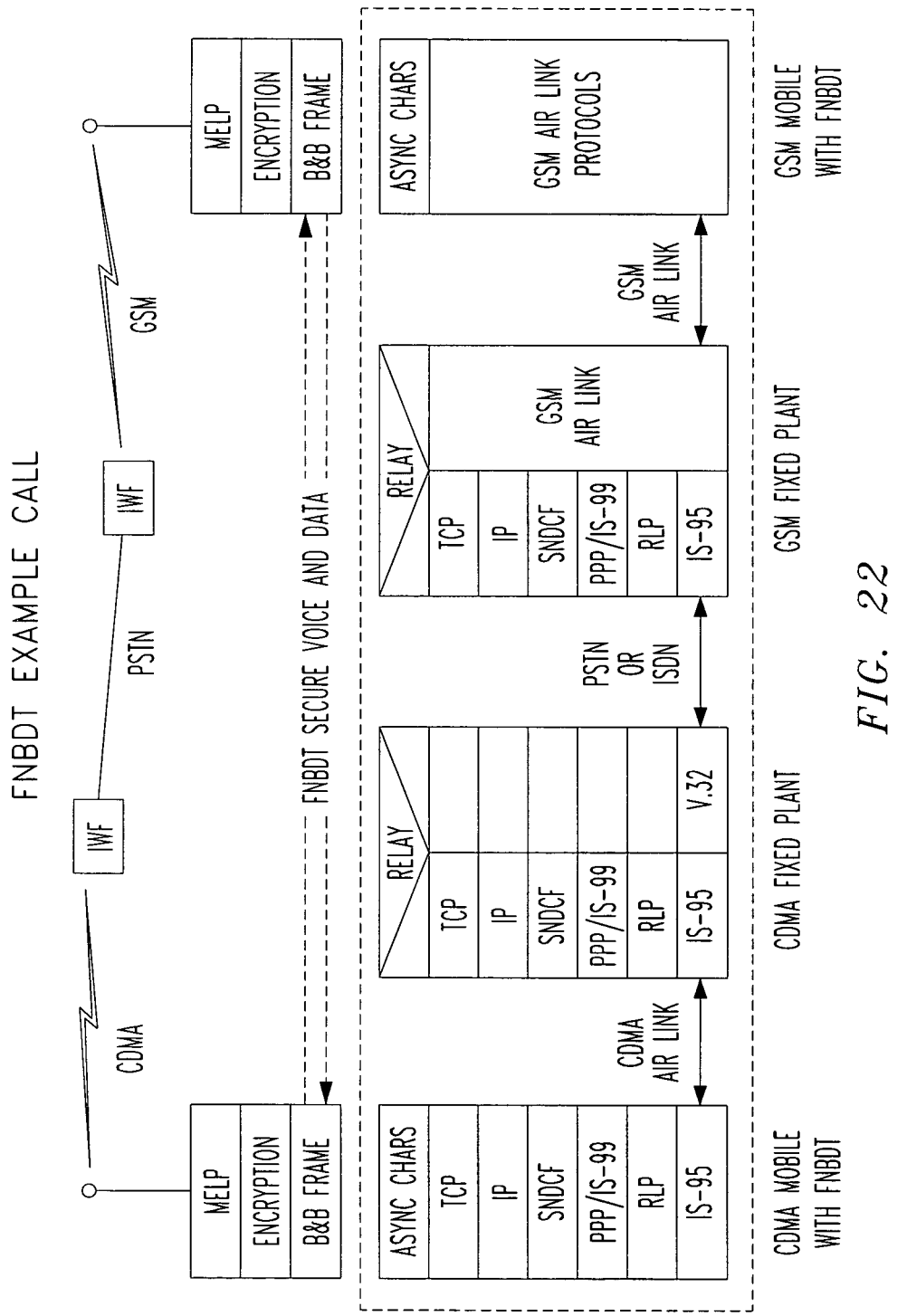
FIG. 22 shows a conventional FNBDT example call.

FIG. 17 shows exemplary display buttons available on the personality faceplate keypad 146, in accordance with the principles of the present invention.

In particular, as shown in FIG. 17, exemplary keys available to a user during use of the reach-back communications terminal 100 are, a Scroll key 510, a PIN Menu key 520, a Zeroize Menu key 530, a Key Mgmt Menu key 540, a Service Menu key 550, a Config Menu key 560 and a Security Menu key 570.

The Scroll key 510 allows a user to scroll through menu options viewable on the personality face plate display 147.

The PIN Menu key 520 allows a user of the reach-back communications terminal 100 to lock the terminal until a proper PIN has been entered on the personality faceplate keypad 146. Moreover, the PIN Menu key 520 allows a user of the reach-back communications terminal to enter a menu to change the existing stored PIN. PIN menu is displayed only when an authorized user exists within the reach-back communications terminal 100, and the reach-back communications terminal 100 is Off-Hook and not in a secure call.

The Zeroize Menu key 530 allows a user of the reach-back communications terminal to zeroize a keyset, i.e., zeroize all keys and zeroize APK. Moreover, the Zeroize key 530 allows deletion of an authorized user of the reach-back communications terminal 100. Menus associated with the Zeroize Menu key 530 may be restricted to the Master User of the reach-back communications terminal 100.

The Key Mgmt Menu key 540 allows a user of the reach-back communications terminal to enter a menu to view keys and generate an APK.

The Security Menu key 570 allows a user of the reach-back communications terminal to enter menus for adding a user, deleting a user, automatically locking the reach-back communication terminal 100, clear data, automatically secure communications established with the reach-back communications terminal 100, automatically answer data communications and automatically answer a ring to the reach-back communications terminal 100. The options of deleting a user and automatically locking the reach-back communications terminal are only available to authorized users.

The Config Menu key 560 allows a user of the reach-back communications terminal 100 to view a key status, clear data, set FNBDT timeouts, set bypasses, set a data port rate and set a modem data rate.

The Service Menu key 550 allows a user of the reach-back communications terminal 100 to verify software versions and determine the serial number of the personality face plate 145.

While the invention has been described with reference to the exemplary embodiments thereof, those skilled in the art will be able to make various modifications to the described embodiments of the invention without departing from the true spirit and scope of the invention.

What is claimed is:

1. A portable reach-back communications terminal, comprising:
    an encryption device, of a portable secure communications terminal, to encrypt a signal produced by a private branch exchange (PBX) handset base of said portable secure communications terminal; and
    an audio mixer, of said portable secure communications terminal, between an input from said PBX handset base of said portable secure communication terminal and said encryption device, said audio mixer converting a 4-wire input from said PBX handset base into a 2-wire output connected to said encryption device.

2. The portable reach-back communications terminal according to claim 1, further comprising:
    a gain control switch to set a gain of said audio mixer.

3. The portable reach-back communications terminal according to claim 2, wherein:
    said gain control switch has at least 4 positions corresponding to at least 4 gain seen in said 2-wire output of said audio mixer.

4. The portable reach-back communications terminal according to claim 1, further comprising:
- a connection for a handset disconnected from said PBX handset base; and
- a switchable bypass path between said input from said PBX handset base and said connection for said handset, allowing otherwise normal operation of said handset with said PBX handset base.

5. A method of allowing encrypted communications over an unsecure private branch exchange (PBX) system, comprising:
- disconnecting a handset from a PBX handset base unit of a portable secure communications terminal;
- connecting a 4-wire input of an audio mixer to a handset jack on said PBX handset base unit vacated by said handset, said auto mixer of said portable secure communications terminal converting said 4-wire input from said PBX handset base into a 2-wire output; and
- connecting an encryption device, to encrypt a signal produced by said PBX handset base unit of said portable secure communications terminal, to said 2-wire output of said audio mixer.

6. The method of allowing encrypted communications over an unsecure private branch exchange (PBX) system according to claim 5, wherein:
- said encryption device includes a secure handset.

7. The method of allowing encrypted communications over an unsecure private branch exchange (PBX) system according to claim 5, further comprising:
- setting a gain of said audio mixer to a position which allows establishment of communications through said encryption device.

8. The method of allowing encrypted communications over an unsecure private branch exchange (PBX) system according to claim 7, wherein:
- said gain of said audio mixer is set by a multi-position switch.

9. The method of allowing encrypted communications over an unsecure private branch exchange (PBX) system according to claim 8, wherein:
- said multi-position switch is a multi-position slide switch.

10. The method of allowing encrypted communications over an unsecure private branch exchange (PBX) system according to claim 9, wherein:
- said multi-position slide switch has at least 4 positions, each of said 4 positions causing a different, pre-determined gain in said audio mixer.

11. The method of allowing encrypted communications over an unsecure private branch exchange (PBX) system according to claim 5, further comprising:
- connecting said handset to a bypass path from said audio mixer allowing use of said handset with said PBX handset base unit.

12. Apparatus for allowing encrypted communications over an unsecure private branch exchange (PBX) system, comprising:
- means for disconnecting a handset from a PBX handset base unit of a portable secure communications terminal;
- means for connecting a 4-wire input of an audio mixer to a handset jack on said PBX handset base unit vacated by said handset, said auto mixer of said portable secure communications terminal converting said 4-wire input from said PBX handset base into a 2-wire output; and
- means for connecting an encryption device, to encrypt a signal produced by said PBX handset base unit of said portable secure communications terminal, to said 2-wire output of said audio mixer.

13. The apparatus for allowing encrypted communications over an unsecure private branch exchange (PBX) system according to claim 12, wherein:
- said encryption device includes a secure handset.

14. The apparatus for allowing encrypted communications over an unsecure private branch exchange (PBX) system according to claim 12, further comprising:
- means for setting a gain of said audio mixer to a position which allows establishment of communications through said encryption device.

15. The apparatus for allowing encrypted communications over an unsecure private branch exchange (PBX) system according to claim 14, wherein:
- said gain of said audio mixer is set by a multi-position switch.

16. The apparatus for allowing encrypted communications over an unsecure private branch exchange (PBX) system according to claim 15, wherein:
- said multi-position switch is a multi-position slide switch.

17. The apparatus for allowing encrypted communications over an unsecure private branch exchange (PBX) system according to claim 16, wherein:
- said multi-position slide switch has at least 4 positions, each of said 4 positions causing a different, pre-determined gain in said audio mixer.

18. The apparatus for allowing encrypted communications over an unsecure private branch exchange (PBX) system according to claim 12, further comprising:
- means for connecting said handset to a bypass path from said audio mixer allowing use of said handset with said PBX handset base unit.

19. The reach-back communications terminal according to claim 1, wherein:
- said encryption device is a Future NarrowBand Digital Terminal (FNBDT) encryption device.

20. The method of allowing encrypted communications over an unsecure private branch exchange (PBX) system according to claim 5, wherein:
- said encryption device is a Future NarrowBand Digital Terminal (FNBDT) encryption device.

21. The apparatus for allowing encrypted communications over an unsecure private branch exchange (PBX) system according to claim 12, wherein:
- said encryption device is a Future NarrowBand Digital Terminal (FNBDT) encryption device.

* * * * *